United States Patent [19]

Takahara et al.

[11] Patent Number: 4,839,881
[45] Date of Patent: Jun. 13, 1989

[54] PICKUP TRANSPORT DEVICE FOR OPTICAL DISC APPARATUS

[75] Inventors: Ichiro Takahara, Hirakata; Masaaki Azumi, Osaka; Kazuo Shigetomi, Higashiosaka; Takaya Kamimura, Nara; Hideki Ishida, Osaka, all of Japan

[73] Assignee: Sanyo Electric Co., Ltd., Moriguchi, Japan

[21] Appl. No.: 150,422

[22] PCT Filed: May 28, 1987

[86] PCT No.: PCT/JP87/00346
§ 371 Date: Feb. 3, 1988
§ 102(e) Date: Feb. 3, 1988

[87] PCT Pub. No.: WO87/07752
PCT Pub. Date: Dec. 17, 1987

[30] Foreign Application Priority Data

Jun. 5, 1986 [JP] Japan .................................. 61-130717
Sep. 19, 1986 [JP] Japan .................................. 61-144429
Sep. 19, 1986 [JP] Japan .................................. 61-22200
Oct. 8, 1986 [JP] Japan .................................. 61-239772
Apr. 20, 1987 [JP] Japan .................................. 62-96489

[51] Int. Cl.⁴ .................... G11B 1/00; G11B 21/04; G11B 25/04
[52] U.S. Cl. .................................. 369/75.2; 369/77.1; 369/195; 369/199
[58] Field of Search .................. 369/75.2, 199, 195, 369/77.1

[56] References Cited

U.S. PATENT DOCUMENTS 4,216,969 8/1980 Allen .................................. 369/77.2

FOREIGN PATENT DOCUMENTS 55-77053 6/1980 Japan .
56-77953 6/1981 Japan .
56-174156 12/1981 Japan .
57-169936 10/1982 Japan .

Primary Examiner—Steven L. Stephan
Attorney, Agent, or Firm—Armstrong, Nikaido Marmelstein Kubovcik & Murray

[57] ABSTRACT

To accurately move a pickup 31 along a radial line of an optical disc in an optical disc apparatus for recording signals on both sides of the disc or reproducing the signals from the both sides, the pickup 31 is mounted on a support base 30 coupled to transport means and movable by being guided by a U-shaped guide assembly 5 which is fixedly and accurately positioned on a chassis carrying a disc drive motor. The guide assembly 5 comprises a pair of straight travel guide portions disposed in parallel to each other on opposite sides of the plane of rotation of the disc, and a circular-arc guide portion interconnecting the two guide portions. When reproducing the recorded signals, the pickup 31 accurately reciprocatingly moves on the disc radial line along the straight travel guide portions, and when the reproduction position is changed from one side of the disc to the other side, the pickup quickly moves upward or downward along the circular-arc guide portion.

3 Claims, 26 Drawing Sheets

FIG.21
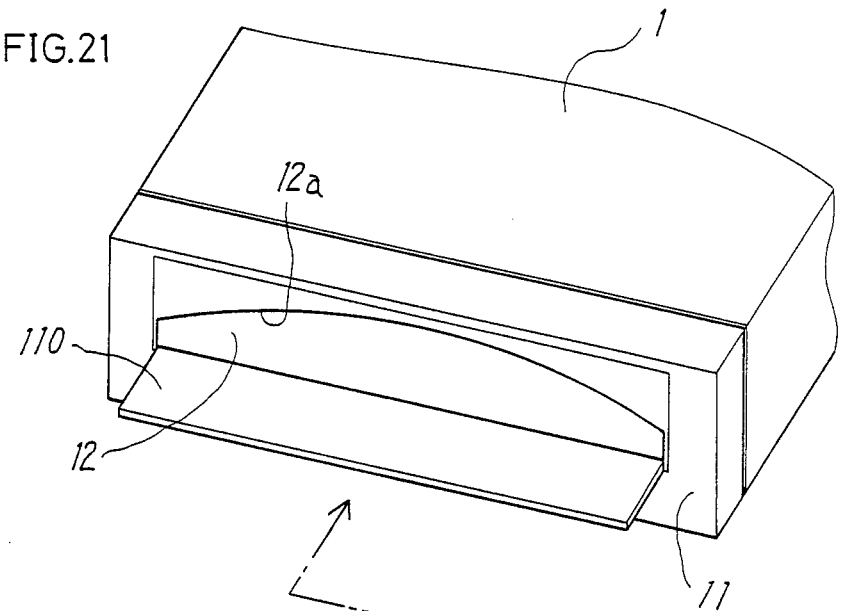
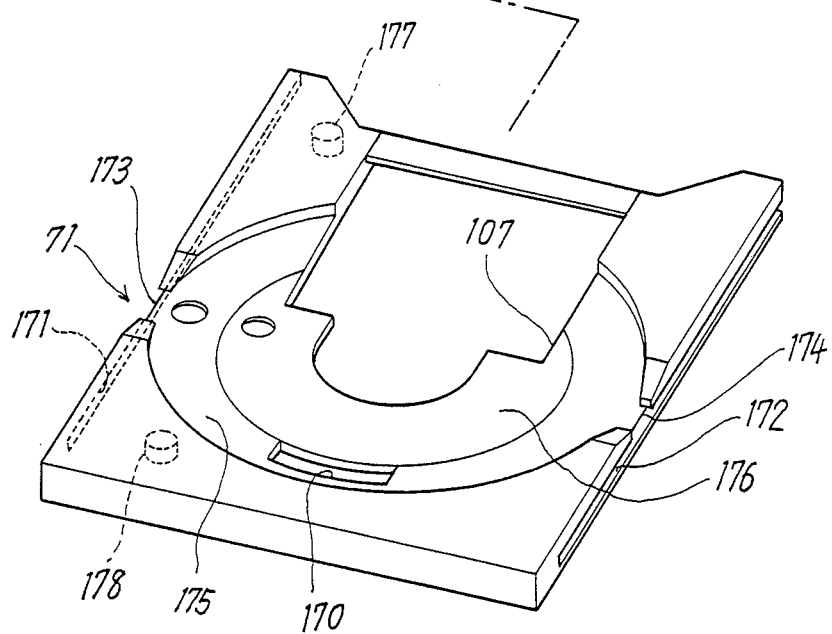

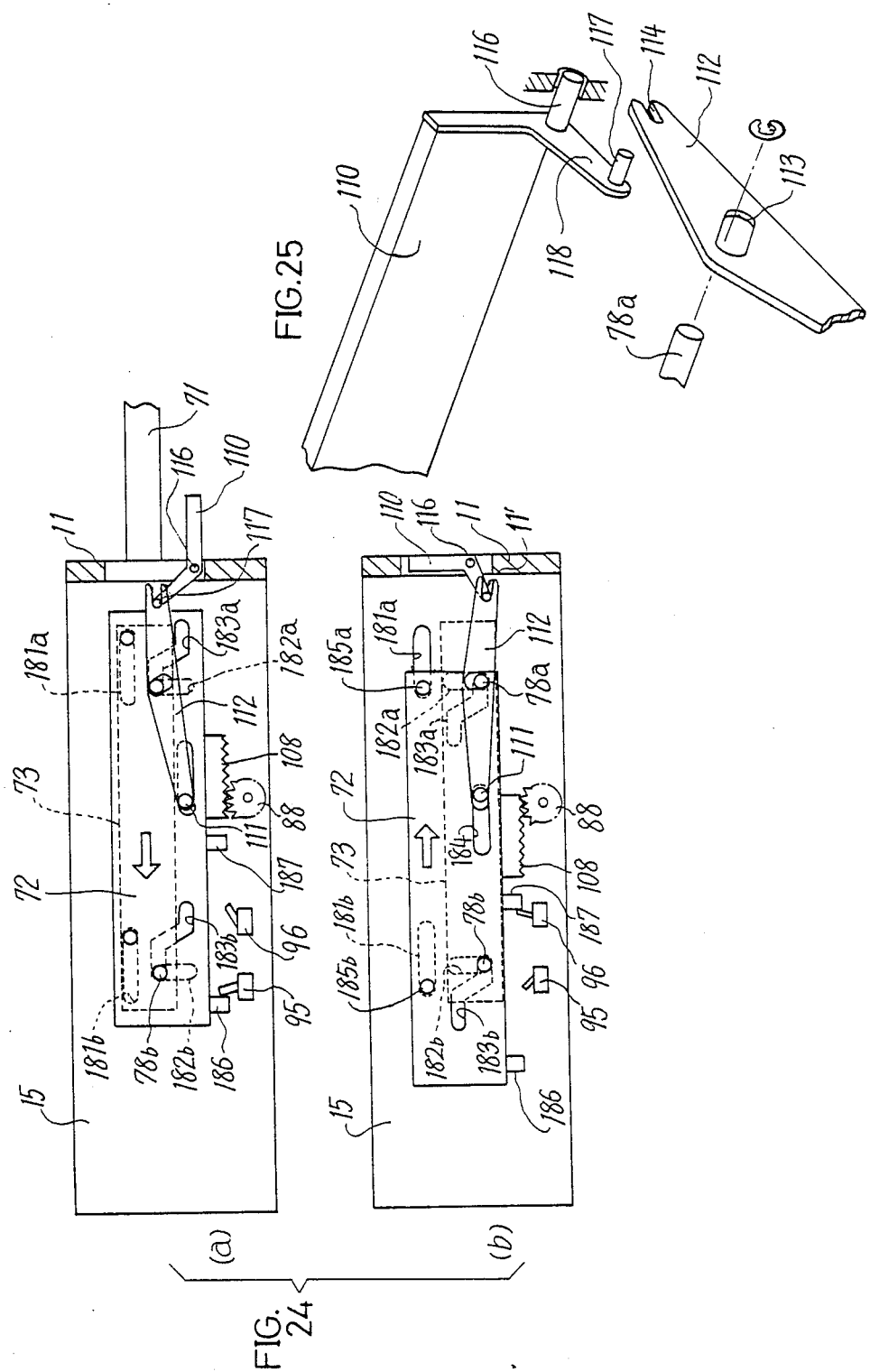

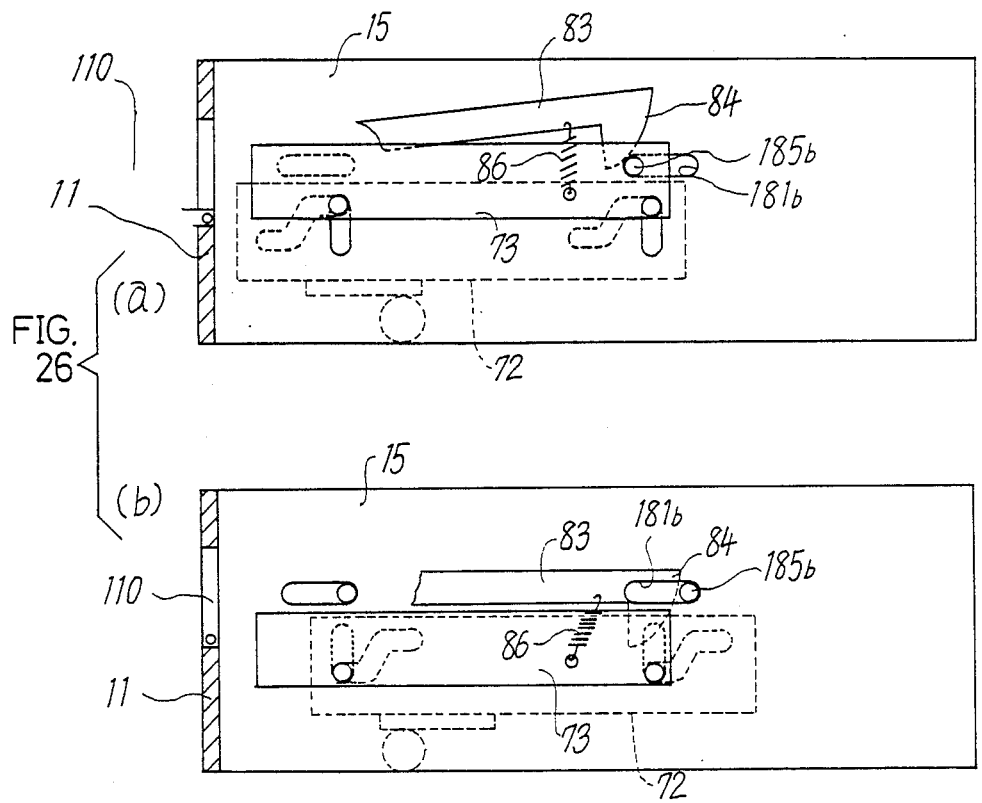
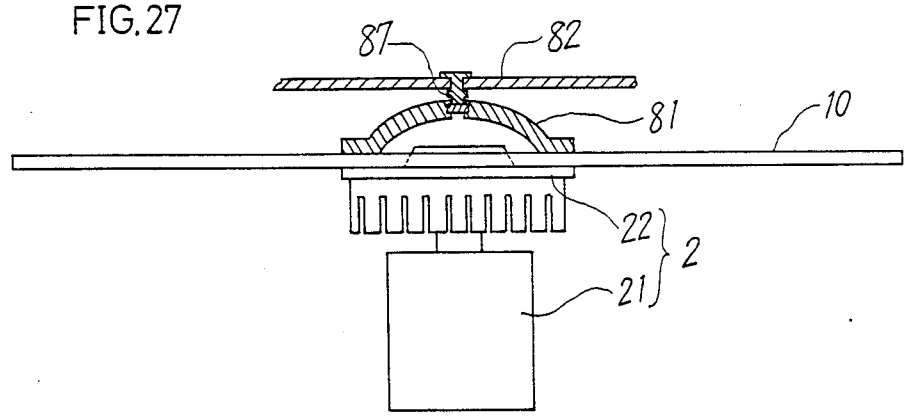

PICKUP TRANSPORT DEVICE FOR OPTICAL DISC APPARATUS

TECHNICAL FIELD

The present invention relates to an optical disc apparatus for reproducing signals from the record surfaces on both sides of an optical disc or for recording signals on both surfaces of the disc, and more particularly to a device for transporting a signal recording or reproducing pickup radially of the disc.

BACKGROUND ART

When the signals recorded on opposite sides of an optical disk are reproduced using a common optical video disc reproduction apparatus, it is necessary to remove the disc from the apparatus after the reproduction of the signal from one side, turn the disc upside down and load the disc into the apparatus again for the reproduction of the signals from the other side. Accordingly, this procedure involves the problem of being very cumbersome.

On the other hand, a device has been proposed which is adapted to reproduce the signal continuously without turning the disc upside down (Unexamined Japanese patent application SHO 57-169936). With reference to FIG. 38, this device comprises transport means 164 having a rotary mechanism 162 and a feed mechanism 163, a crank arm 161 mounted on the transport means 164, and a signal reproducing pickup 160 attached to the forward end of the arm. With the device, an optical disc 10 is rotated at a high speed by a spindle motor 21, and the feed mechanism 163 operates to move the pickup 160 from the inner periphery of the disc toward its outer periphery radially thereof for the signal reproduction from one side of the disc. When the pickup 160 reaches the outer periphery, the rotary mechanism 162 operates to rotate the crank arm 161 through 180 degrees, whereby the pickup 160 is inverted to a position opposed to the other side of the disc. The pickup is thereafter moved from the disc outer periphery toward the inner periphery for signal reproduction. Thus, the signal can be reproduced from opposite sides of the disc continuously by the single pickup.

The pickup has an extremely exquisite sensor structure, for example, of the mechanical type, electric type or optical type including a semiconductor laser. In the case of the optical type, the distance between the disc record face and the pickup is about 2 mm, and this distance is maintained within a variation range of ±1.5 micrometers during reproduction.

To assure the optical disc apparatus of signal reproduction with high fidelity, the pickup must perform a tracking operation with high precision, so that the pickup must be movable accurately along a radial line of the disc while being maintained at a predetermined level. With the conventional device described above, the transport means 164 comprises two drive mechanisms, i.e. the rotary mechanism 162 and the feed mechanism 163, which are different in the mode of operation and connected together, and the pickup is so supported as to be reciprocatingly movable and also rotatable. The increased freedom of movement given to the pickup invariably impairs the precision with which the pickup is positioned. It is extremely difficult to accurately position the pickup on the radial line of the disc by the inversion of the crank arm.

Further with the conventional device, the influence of the deflection of the pickup in the circumferential direction of the disc may be precluded by electrical processing, whereas variations in the distance between the pickup and the disc record face could lead to errors in reproduction tracking. Especially when reproducing signals from both sides of the disc, the pickup must be held at the specified level from the record face on each disc side with high precision, whereas the conventional device fails to afford such high precision.

DISCLOSURE OF THE INVENTION

The object of the present invention is to provide a transport device for use in an optical disc apparatus for reproducing signals from opposite sides of a disc or recording signals on opposite sides of the disc, the device having a simple construction and yet adapted to accurately transport a pickup on both sides of the disc along a radial line of the disc.

The pickup transport device of the invention comprises a support base 30 having mounted thereon a pickup 31 for reproducing signals from an optical disc or recording signals on the optical disc, and a guide assembly 5 for guiding the support base 30, the guide assembly being provided at a specified position on a chassis carrying a disc drive motor, the support base 30 being coupled to transport means and movable on the guide assembly 5.

The guide assembly 5 comprises a pair of straight travel guide portions disposed in parallel to each other and positioned on opposite sides of the plane of rotation of the disc for guiding the pickup 31 along a radial line of the disc and a circular-arc guide portion interconnecting the ends, positioned radially outwardly of the disc, of the straight travel guide portions.

The support base 30 is reciprocatingly movable along the guide portions of the guide assembly 5 by the operation of the transport means. When the pickup, completing signal reproduction or recording on one side of the disc, is to be brought to the other side for reproduction or recording, the support base 30 carrying the pickup 31 is transported on the guide assembly 5 in on direction, inverted along the circular-arc guide portions and brought to a position opposed to the other record face. Accordingly, the signal can be recorded on or reproduced from both sides of the disc continuously.

With the pickup transport device embodying the invention, the support base 30 carrying the pickup 31 merely travels along the guide assembly 5 wherein the straight travel guide portions are continuous with the circular-arc guide portions in a U-shaped curved form, unlike the conventional device wherein the rotary mechanism is used for inversion. The guide assembly 5 is therefore simple in construction. Further because it is easy to fix the guide assembly 5 accurately in position on the chassis carrying the disc drive motor thereon, the path of travel of the support base 30 can be accurately aligned with the radial line of the disc, consequently permitting the pickup 31 to move accurately on the disc radial line while being maintained at a specified level.

BRIEF DESCRIPTION OF THE DRAWINGS

FIG. 21 a perspective view showing a disc tray as removed from a cabinet;

FIGS. 24 (a) and (b) are side elevations showing the operation of a loading plate;

FIG. 25 is a fragmentary exploded perspective view showing a door opening mechanism;

FIGS. 26 (a) and (b) are views showing the chucking assembly as seen from inside the main chassis to illustrate the operation of the assembly;

FIG. 27 is a side elevation partly broken away and showing the disc as chucked;

FIGS. 30 to 32 show improved structures for supporting the guide poles;

FIG. 30 is a fragmentary plan view showing a pickup transport device;

FIG. 31 is a perspective view of the support structure for the lower guide pole;

FIG. 32 is a front view showing the support structure for the upper guide pole;

FIGS. 33 to 34 show another embodiment of pickup transport device;

FIG. 33 is a perspective view of a pickup device;

FIG. 34 is a fragmentary plan view of the same device;

FIGS. 35 to 37 show another pickup transport device;

FIG. 35 is a perspective view partly broken away and showing the transport device;

FIG. 36 is a perspective view of a pickup device;

FIG. 37 is a perspective view of a support base; and

BEST MODE OF CARRYING OUT THE INVENTION

FIGS. 1 to 29 show an optical video disc reproduction apparatus equipped with a pickup transport device of the invention.

First, the video disc reproduction apparatus will be described generally.

Figure 2:
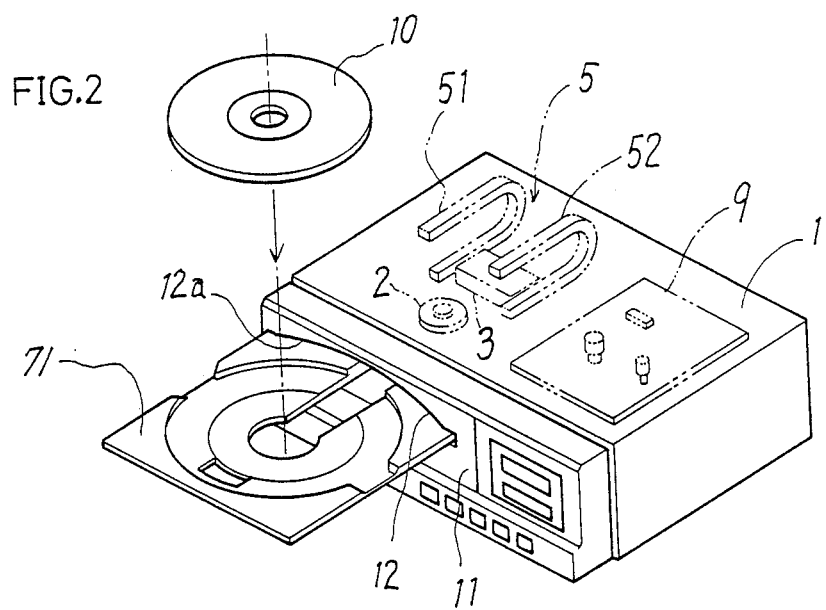
FIG. 2 is a perspective view showing the appearance of a video disc reproduction apparatus.

With reference to FIG. 2, a cabinet 1 in the form of a flat rectangular parallelepipedon is internally provided with a drive assembly 2 for an optical disc 10, and as opposed to the device, a pickup device 3 and a guide assembly 5 which constitute the pickup transport device of the invention. Also provided within the cabinet is a circuit board 9 formed with electric circuits including a control circuit for these devices, tracking control circuit and image signal processing circuit. A disc tray 71 for placing the disc 10 thereon is provided movably into or out of an opening 12 formed in a front panel 11 and is reciprocatingly movable between a disc discharged position where the disc is placeable on the tray or removable therefrom and a disc inserted position above the disc drive assembly 2, by being driven by the loading means to be described later.

Figure 16:
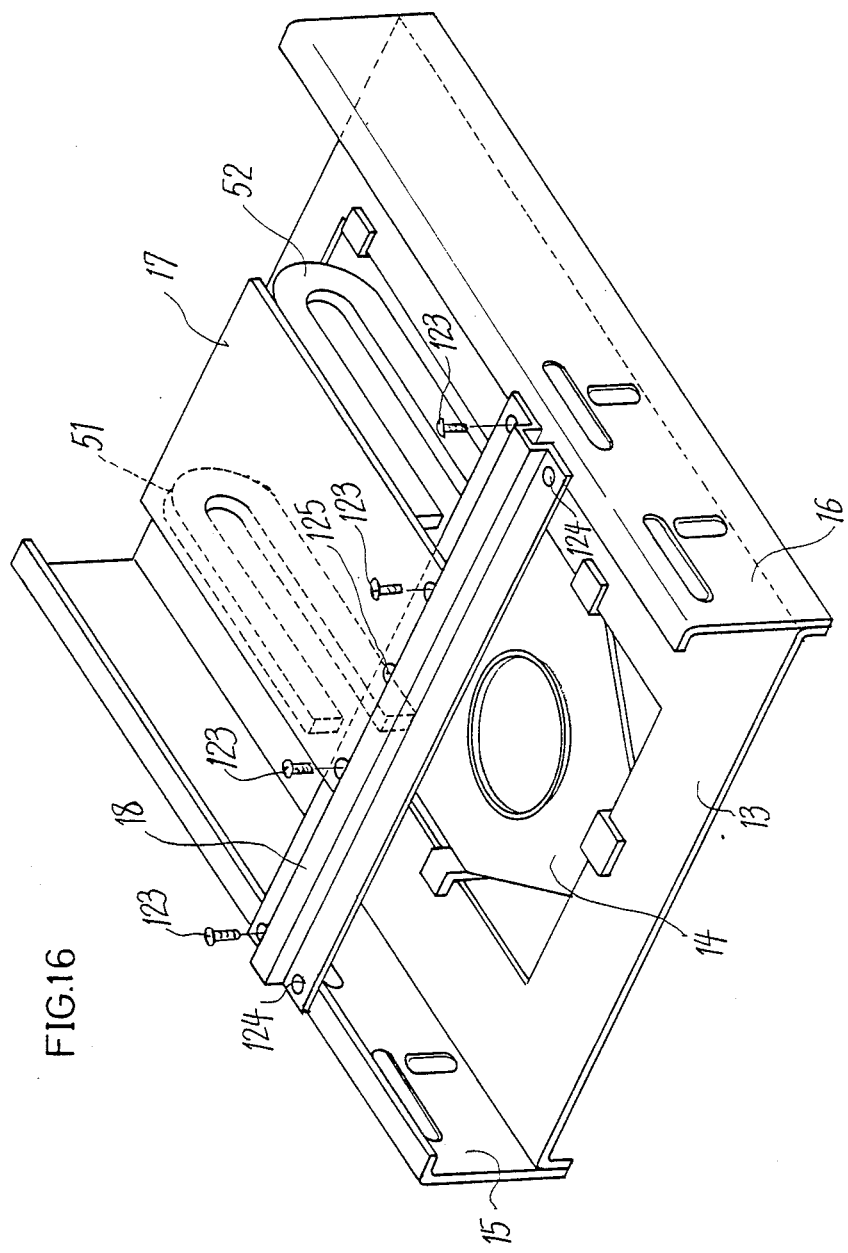
FIG. 16 is a perspective view of the main chassis and subchassis.
Figure 17:
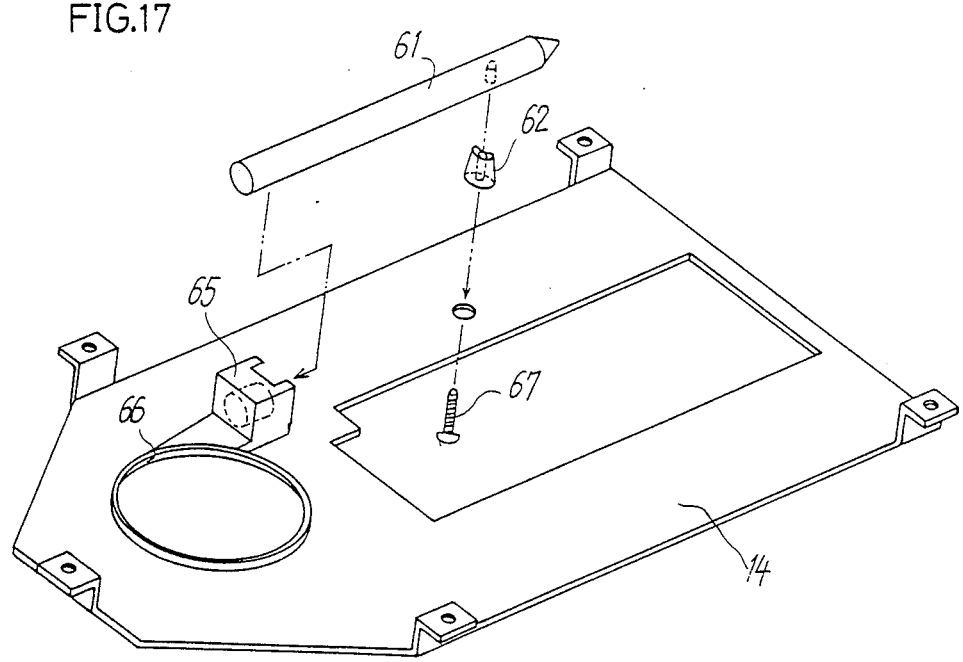
FIG. 17 is a perspective view of the subchassis.

A main chassis 13 shown in FIG. 16 is provided inside the cabinet 1. A subchassis 14 shown in FIG. 17 is fixed to the main chassis 13 approximately at its center.

Figure 1:
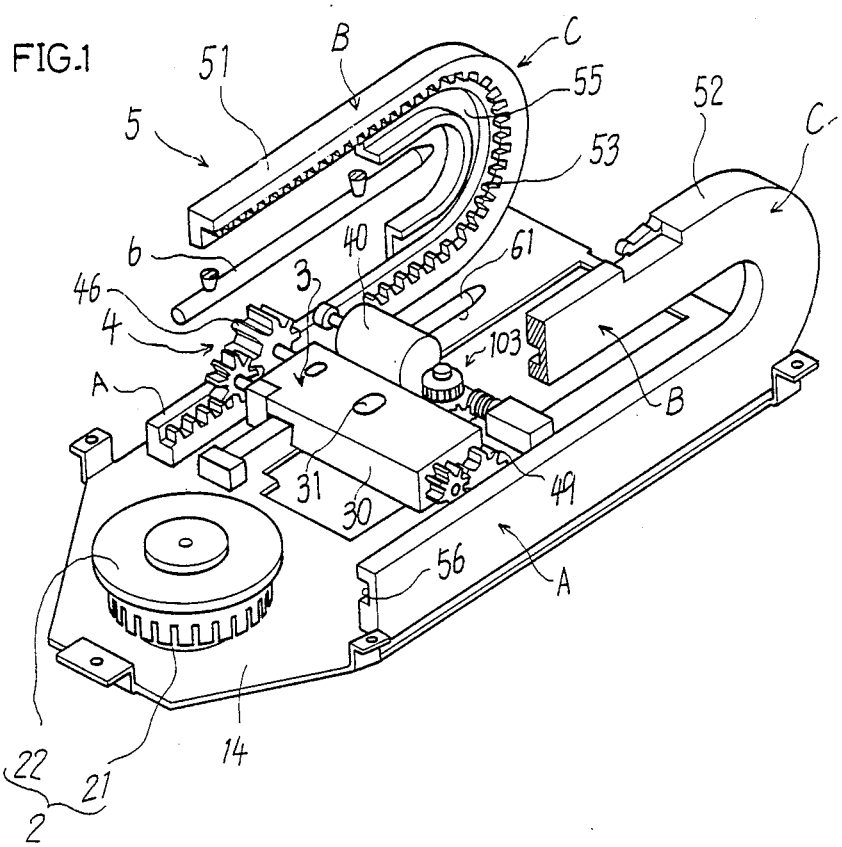
FIG. 1 is a perspective view partly broken away and showing a pickup transport device of the invention.

As seen in FIG. 1, the disc drive assembly 2, which comprises a spindle motor 21 and a turntable 22, is mounted on the subchassis 14. The pickup device 3 and the guide assembly 5 are arranged as opposed to the drive assembly 2.

The pickup device 3 includes a pickup 31 having an optical system, etc. and mounted on a support base 30 approximately at its center, and is provided with a self-propelled assembly 4. The assembly 4 comprises gear mechanisms arranged at the respective sides of the support base 30 and a feed motor 40 for driving the gear mechanisms.

Figure 5:
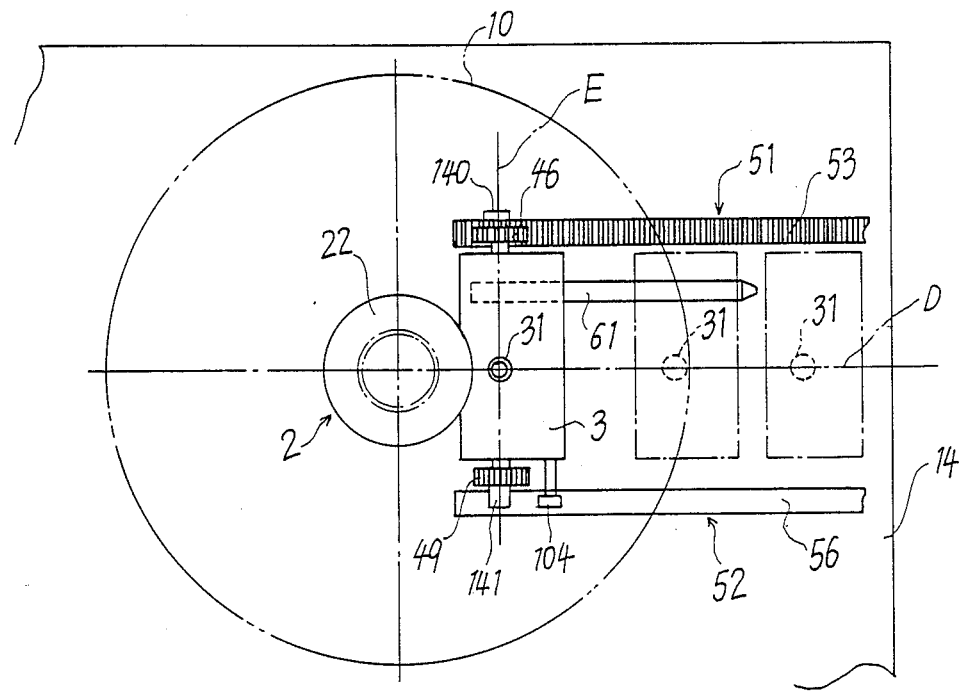
FIG. 5 is a plan view showing a pickup device and a guide assembly as positioned relative to an optical disc.

The guide assembly 5 comprises left and right guide rails 51 and 52, each U-shaped. The two guide rails 51, 52 are fixedly mounted on the subchassis 14 and are parallel to each other and to a disc radial line D extending in the direction of movement of the disc tray as seen in FIGS. 2 and 5.

Figure 7:
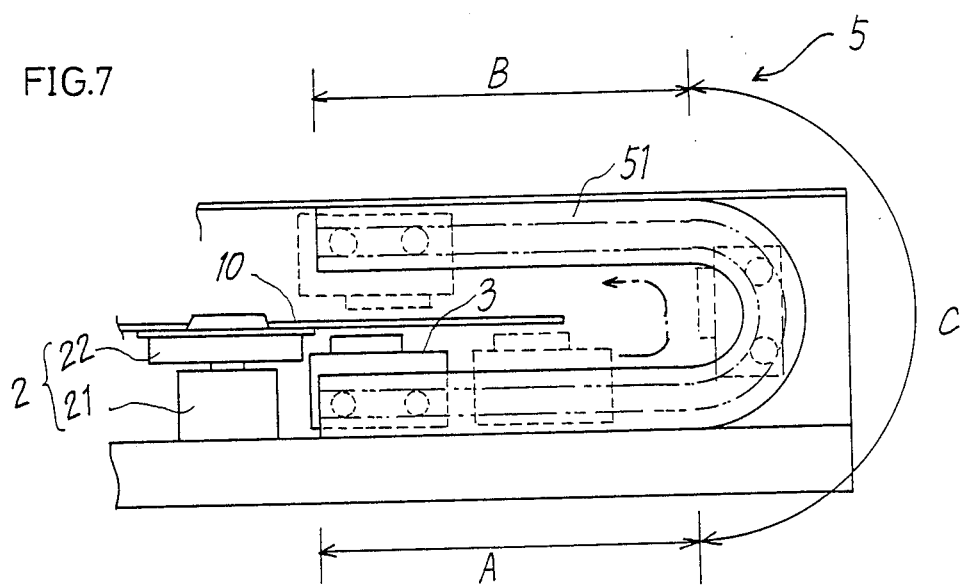
FIG. 7 is a side elevation showing guide portions of the guide assembly.

With reference to FIG. 7, each of the guide rails 51, 52 comprises a lower straight travel guide portion A extending horizontally below the disc 10 placed on the turntable 22, an upper straight travel guide portion B extending horizontally above the disc, and a circular-arc guide portion C interconnecting the two guide portions A, B. Accordingly, the pickup device 3 is adapted to reproduce a signal from the rear side of the disc 10 while being guided along the lower guide portions A, to be turned upside down and brought to above the disc 10 by moving along the circular-arc guide portions C, and to reproduce signals from the front side of the disc while being guided along the upper guide portions B.

To fix the upper guide portions B in position, a top chassis 17 is secured to the upper side of the two guide rails 51, 52 and is fixed at one end thereof to a support frame 18 provided above the main chassis 13 as seen in FIG. 16.

Figure 6:
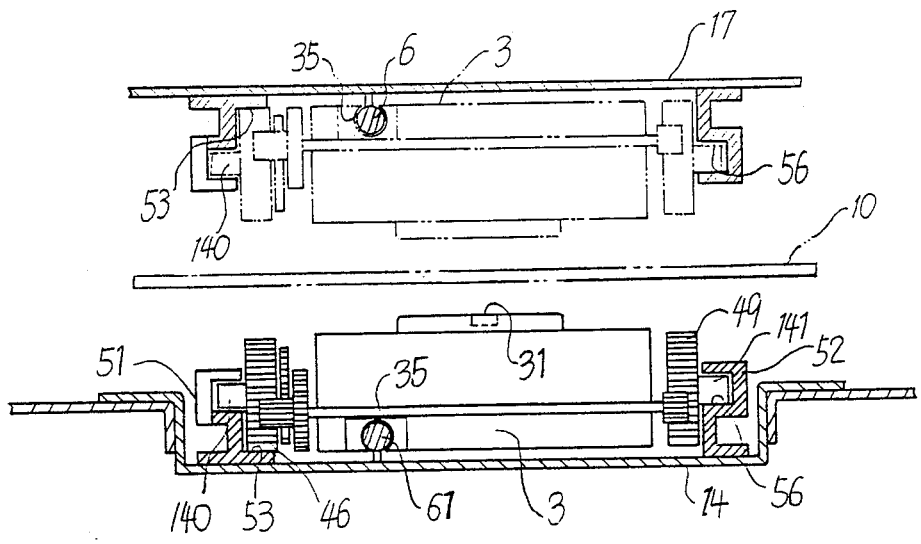
FIG. 6 is a front view showing the pickup transport device.
Figure 12:
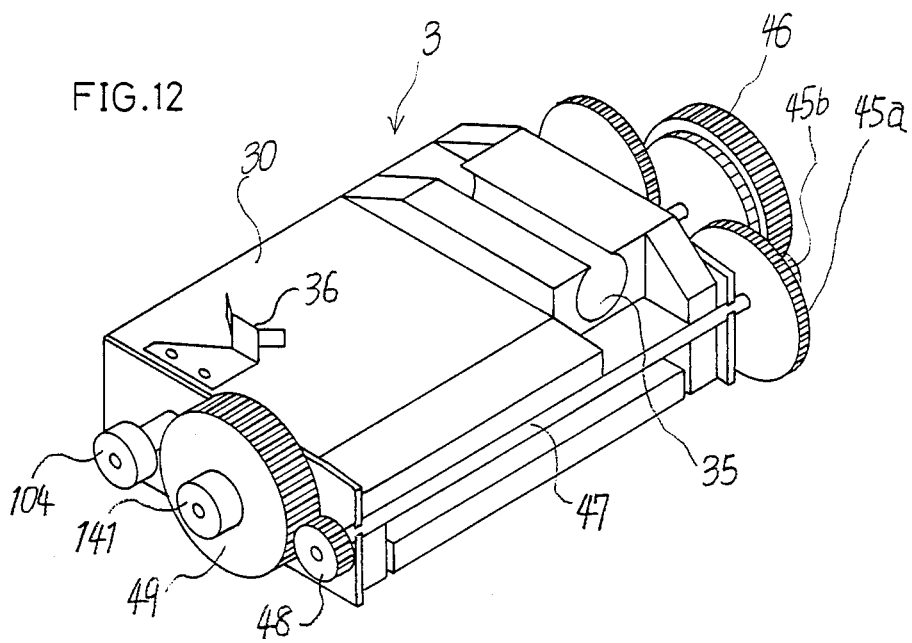
FIG. 12 is a perspective view of the pickup device as seen from the rear side.
Figure 18:
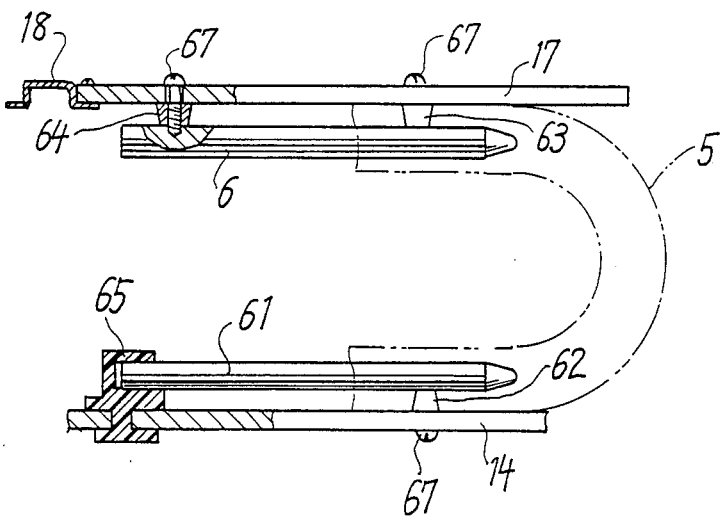
FIG. 18 is a side elevation partly broken away and showing a structure for mounting guide poles.

With reference to FIGS. 1, 6 and 18, an upper guide pole 6 and a lower guide pole 61, which are parallel to the straight travel guide portions of the guide rail, are supported on the top chassis 17 and the subchassis 14, respectively, for guiding the straight travel of the pickup device 3 more accurately. On the other hand, the support base 30 of the pickup device 3 is formed with a slide groove 35 of circular-arc cross section for the guide pole to pass therethrough as shown in FIG. 12. While the pickup device 3 is in signal reproduction operation, the slide grooved portion 35 slides along the guide pole 6 or 61, whereby the pickup device is prevented from backlashing during straight travel for tracking with improved accuracy.

Figure 28:
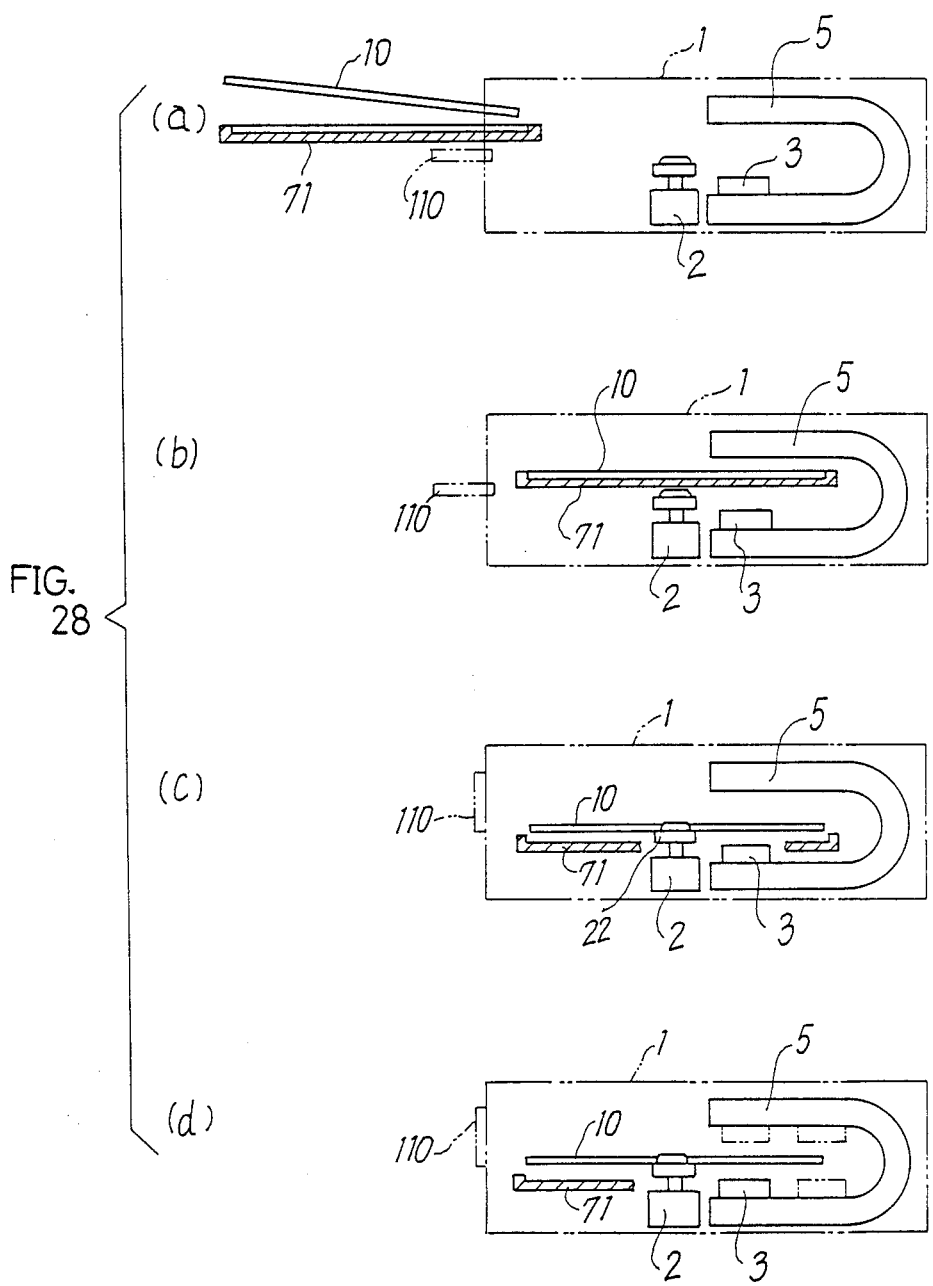
FIGS. 28 (a) to (d) are diagrams illustrating how parts operate in sequence for loading the disc until completion of chucking.

With reference to FIGS. 28 (a) to (d), the operation of the video reproduction apparatus will be described for loading an optical disc thereinto and reproducing signals from the disc.

When reproduction is to be started, the pickup device 3 is in its stand-by position on the lower straight travel guide portions A.

The disc 10 is placed on the disc tray 71 as withdrawn from the cabinet 1 as seen in FIG. 28 (a), whereupon the loading means to be described later is driven to move the disc tray 71 into the cabinet (FIG. 28 (b)). Consequently, the disc tray 71 advances into a space in the center of the guide assembly 5, bringing the disc 10 to the inserted position above the rotary shaft of the disc drive assembly 2 within the cabinet. Subsequently, the chucking assembly to be described later is driven to lower the disc tray 71, whereby the disc 10 is set in its loaded position on the turntable 22 of the drive assembly 2 (FIG. 28 (c)). The disc drive assembly 2 thereafter rotates the disc 10 at a high speed, while the feed motor 40 is driven to travel the pickup device 3 along the guide rails for the reproduction of the signals on the disc 10 (FIG. 28 (d)).

Next, various components of the video disc reproduction apparatus will be described in detail.

Self-Propelled Assembly 4

Figure 10:
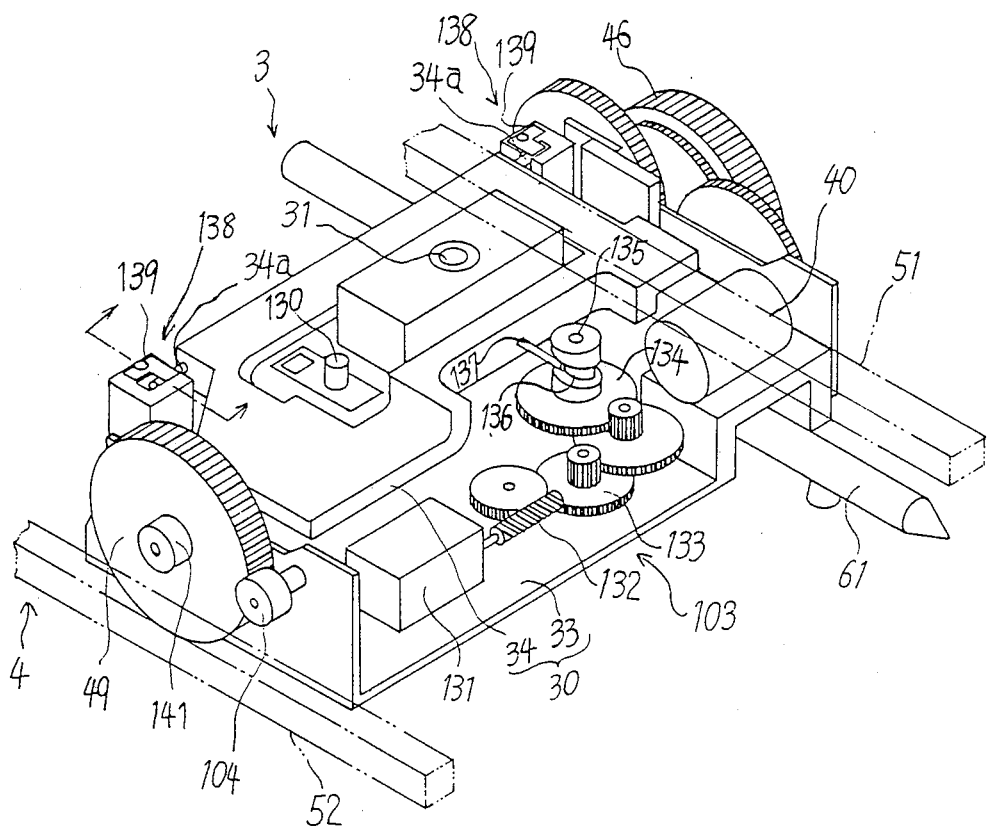
FIG. 10 is a perspective view of the pickup device.

The support base 30 for the pickup device 3 comprises a main base 33 provided with the self-propelled assembly 4, and a subbase 34 mounted on the main base and carrying the pickup 31 as shown in FIG. 10.

Figure 3:
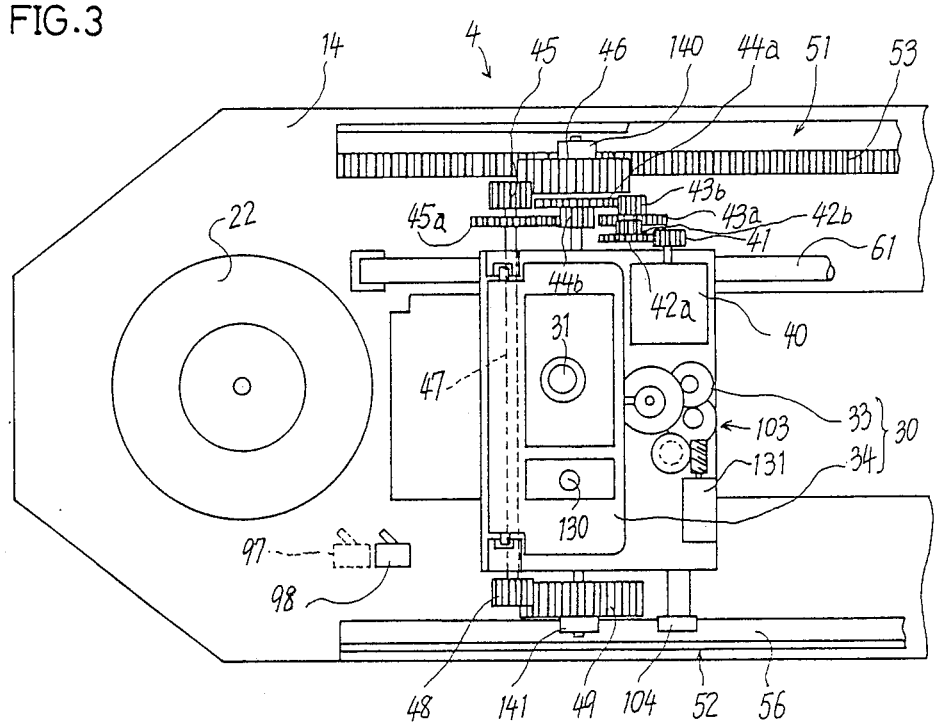
FIG. 3 is a fragmentary plan view of the pickup transport device.
Figure 4:
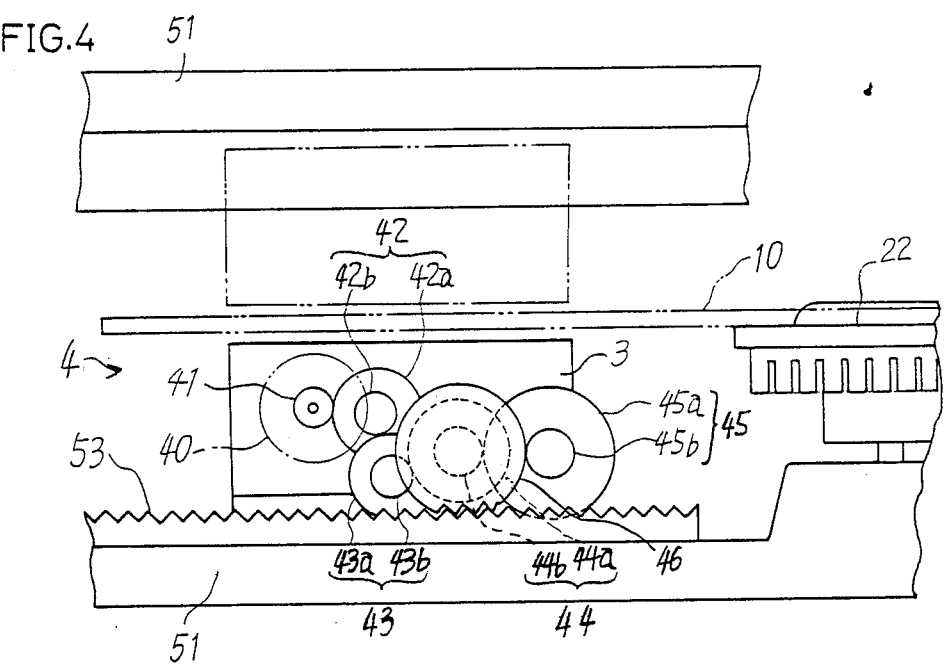
FIG. 4 is a left side view of a self-propelled assembly.

With reference to FIGS. 3 and 4, the self-propelled assembly 4 comprises a left gear mechanism provided on one side of the main base 33 adjacent to the left guide rail 51 and to be driven by the feed motor, and a right gear mechanism disposed adjacent to the right guide rail 52 and coupled to the left gear mechanism by a connecting shaft 47. The left gear mechanism includes first to fifth gears 41, 42, 43, 44, 45 and a left drive gear 46. The rotation of the feed motor 40 is transmitted from the first gear 41 fixed to the motor shaft to the left drive gear 46 via a large gear portion 42a and small gear portion 42b of the second gear 42, a large gear portion 43a and small gear portion 43b of the third gear 3, a large gear portion 44a and small gear portion 44b of the fourth gear 44 and a large gear portion 45a and small gear portion 45b of the fifth gear 45. The right gear mechanism includes a sixth gear 48 connected to the fifth gear 45 by the shaft 47, and a right drive gear 9 in mesh with the gear 48. The small gear portion 45b of the fifth gear and the sixth gear 48, as well as the left drive gear 46 and the right drive gear 49, are identical with each other in specification and design. The shafts for the left and right drive gears 46, 49 are arranged in alignment with a line E extending through the center of the pickup 31 and intersecting the path of travel, D, of the pickup 31 at right angles therewith as shown in FIG. 5.

As shown in FIG. 3, a left roller 140 and a right roller 141 are freely rotatably mounted on the rotary shafts of the left drive gear 46 and the right drive gear 49, respectively. A lead roller 104 positioned at the same level as the right roller 141 is rotatably supported on a side wall front portion, adjacent to the right guide rail 52, of the main base 33.

Pickup Tilting Assembly 103

Figure 11:
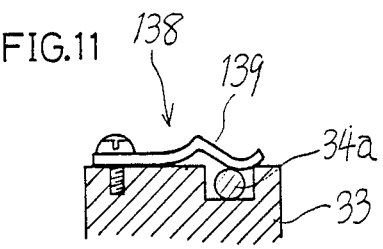
FIG. 11 is a sectional view of a pin support portion.

With reference to FIG. 10, the subbase 34 has pins 34a, 34a projecting from opposite side portions thereof in parallel to the rotary shafts of the drive gears and supported as at 138, 138 on the main base 33 in the vicinity of the right and left drive gears 49, 46. To support the pin 34a, the main base 33 has a recess for the pin to fit in as seen in FIG. 11, and the pin is held depressed by a plate spring 139.

While the optical axis of the pickup 31 must be held perpendicular to the record surface of the optical disc, the orientation of the optical axis of the pickup 31 needs to be corrected if the disc itself is deformed. For this purpose, a tilting assembly 103 is mounted on the main base 33 for slightly pivotally moving the subbase 34 about the pins 34a to finely adjust the position of the subbase 34. The tilting assembly 103 comprises a cam 135 integral with one side of a drive gear 134 supported on the main base 33, a cam follower 137 projecting from the subbase 34 and engaged in a helical cam groove 136 in the cam 135, a gear mechanism 133 including a worm 132, etc. for transmitting the rotation of a tilting motor 131 to the drive gear 134, an optical sensor 130 for detecting the inclination of the subbase 34 relative to the record surface of the optical disc, and an electric circuit (not shown) for converting the detection signal of the sensor to a drive control signal for the motor 131.

Guide Assembly 5

The slide groove 35 of circular-arc cross section for the upper guide pole 6 and the lower guide pole 61 to slidingly pass therethrough is formed in the bottom side of the pickup device 3 as shown in FIG. 12 and elongated in the direction of travel of the pickup device 3. Accordingly, when travelling along the straight travel guide portions of the guide assembly 5, the pickup device 3 is guided for horizontal travel by the grooved slide portion 35 fitting around the lower pole 61 or the upper pole 6 as seen in FIG. 6, permitting the pickup 31 to move along at the specified level relative to the disc 10 without backlashing. The slide groove 35 includes an axially cutout portion for permitting the supports for the pole to pass therethrough, while the groove is conically flared at its opposite ends for guiding the pole end thereinto.

The left guide rail 51 and the right guide rail 52 providing the guide assembly 5 are each U-shaped as shown in FIGS. 1, 7, 8 and 9.

The left guide rail 51 has a left rack portion 53 extending over the entire lengths of the two guide portions A, B and the circular-arc guide portion C for the left drive gear 46 of the self-propelled assembly 4 to mesh therewith, and is formed with a U-shaped left guide groove 55 extending over the entire length of the circular-arc guide portion C and a part of the length of each of the guide portions A, B for the left roller 140 of the pickup device 3 to fit in.

On the other hand, the right guide rail 52 is provided with a right guide groove 56 extending over the entire lengths of the two guide portions A, B and the circular-arc guide portion C for the right roller 141 and the lead roller 104 of the self-propelled assembly 4 to fit in, and is formed with a right rack portion 54 extending over the entire length of the circular-arc guide portion C and a part of the length of each of the guide portions A, B for the right drive gear 49 on the pickup device 3 to mesh with.

When traveling along the lower straight travel guide portions for signal reproduction, the pickup device 3 is driven by the left drive gear 46 in mesh with the left rack portion 53. At this time, the right roller 141 and the lead roller 104 are guided by the right guide groove 56, with the grooved slide portion 35 in sliding contact with the lower guide pole 61. Accordingly, the pickup device 3 is smoothly reciprocatingly movable even by being driven by the left drive gear 46 only, allowing the pickup 31 to move accurately on the radial line D of the disc 10 as seen in FIG. 5.

Figure 8:
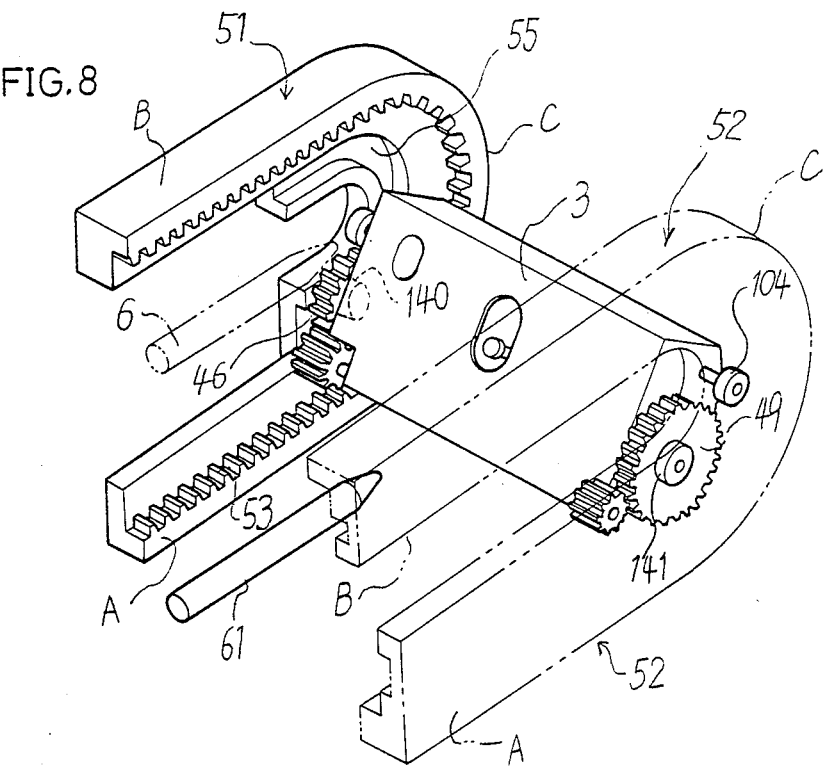
FIG. 8 is a fragmentary perspective view showing the pickup device and the guide assembly.
Figure 9:
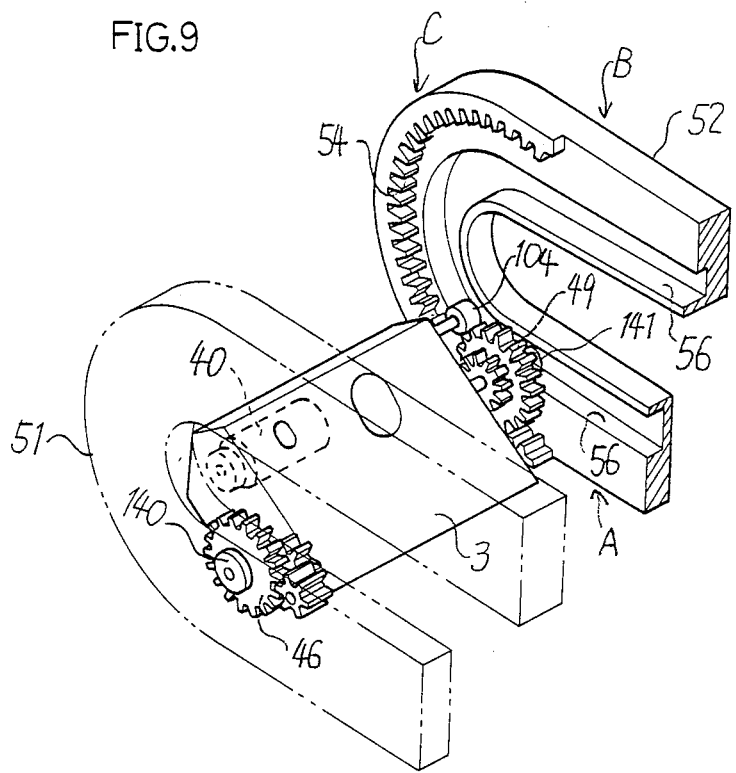
FIG. 9 is a perspective view showing the devices of FIG. 8 as seen from a different direction.

When the pickup device 3 is to reproduce signals from the upper side of the disc 10 after completion of reproduction from the rear side, the device 3 moves off the lower guide pole 61, the left roller 140 fits into the left guide groove 55 and, at the same time, the right drive gear 49 meshes with the right rack portion 54 as shown in FIGS. 8 and 9. Consequently, the pickup device 3 moves up and turns upside down toward a position above the disc along the circular-arc guide portions C by being driven by the two drive gears 46, 49 in mesh with the two rack portions 53, 54, with the three rollers 140, 141 and 104 guided by the guide grooves 55, 56 as seen in FIG. 7. Although the pickup device 3 is not guided by the guide pole in this process, the device is moved up accurately by the driving movement of the drive gears 46, 49 meshing with the rack portions 53, 54, respectively.

The inverted pickup device 3 is further transported toward the center of the disc, causing the grooved slide portion 35 to fit around the upper guide pole 6 (FIG. 6) and releasing the left roller 140 and the right drive gear 49 from the left guide groove 55 and the right rack 54, respectively. Accordingly, the pickup device 3 is thereafter driven by the left drive gear 46 rotating in mesh with the left rack portion 53 while the right roller 141 and the lead roller 104 being guided by the right guide groove 56, with the grooved portion 35 sliding on the upper guide pole 6, whereby signals are reproduced from the upper side of the disc 10. The pickup device 3 is smoothly reciprocatingly movable also in this case by being guided by the upper pole 6 without the deviation of the pickup 31 from the disc radial line.

Since the two guide rails 51, 52 are open toward the front panel, with the circular-arc guide portions projecting outwardly of the disc toward the direction of insertion of the disc, the present device can be adapted to have a reduced overall width.

Figure 13:
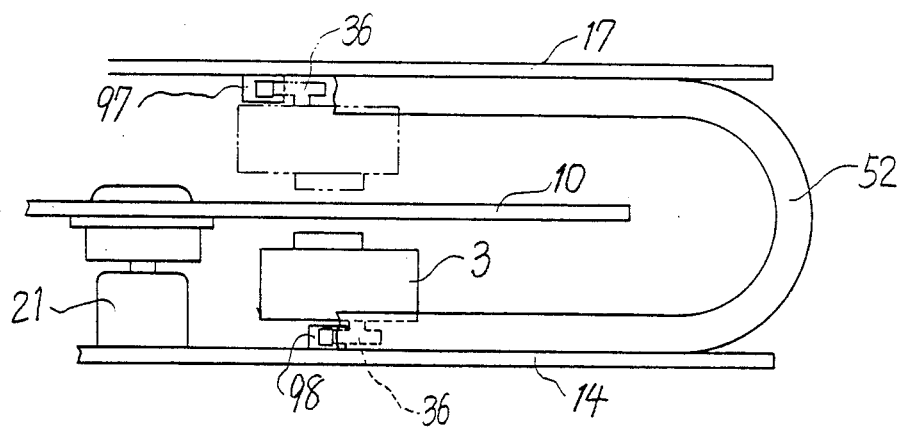
FIG. 13 is a side elevation showing the arrangement of a pair of lead-in switches.

With reference to FIG. 13, the subchassis 14 and the top chassis 17 are provided with limit switches (hereinafter referred to as "SWs"), i.e. a lower lead-in SW 98 and an upper lead-in SW 97, respectively, for detecting the arrival of the pickup device 3 at the end of travel at the disc inner periphery.

On the other hand, the bottom of the pickup device 3 has a lug 36 for actuating the lead-in SWs 97, 98 as seen in FIG. 12.

Figure 14:
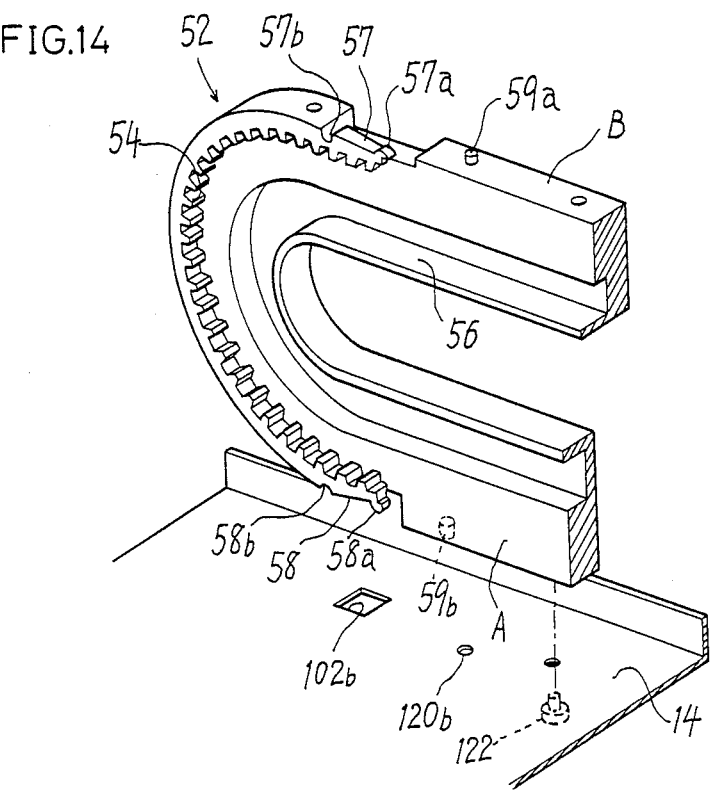
FIG. 14 is an exploded perspective view of a right guide rail.
Figure 15:
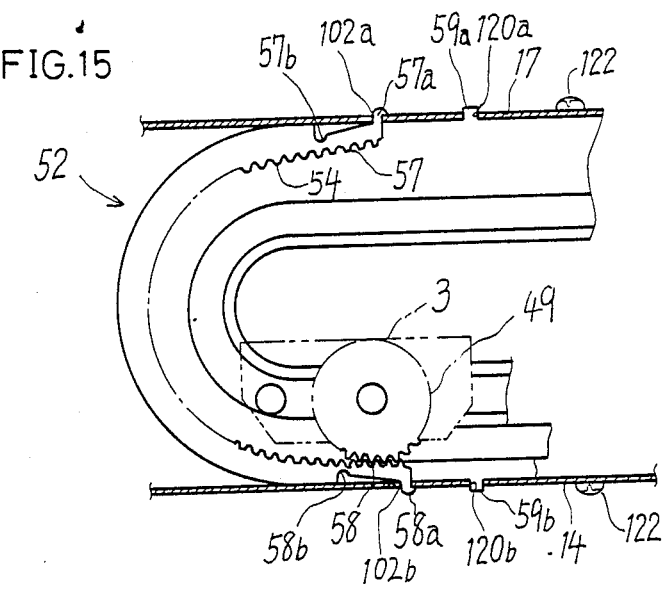
FIG. 15 is a sectional view showing a structure for mounting the right guide rail on a chassis.

FIGS. 14 and 15 show a structure for mounting the right guide rail 52 on the subchassis 14. The right guide rail 52 is made of a synthetic resin in its entirety and is provided at the respective ends of the rack portion 54 with projections 57, 58 projecting from the guide rail body having the guide groove 56. The projections 57, 58 have hooks 57a, 58a at their forward ends and cutouts 57b, 58b at their base ends on the outer side of the rack portion. The projections 57, 58 are elastically deformable away from each other.

Positioning pins 59a, 59b are provided on the upper and lower sides of the straight travel guide portions B, A of the right guide rail 52, respectively.

On the other hand, the top chassis 17 and the subchassis 14 are respectively formed with holes 102a, 102b for the projection hooks 57a, 58b to fit in, and with small holes 120a, 120b for the positioning pins 59a, 59b to fit in, the holes being formed at specified positions.

With reference to FIG. 15, the right guide rail 52 is fixed to the chassis 14, 17 with screws 122, with the positioning pins 59a, 59b fitted in the small holes 120a, 120b. Further the hooks 57a, 58a of the projections 57, 58 as elastically deformed are engaged in the holes 102a, 102b of the chassis. As a result, the opposite ends of the right rack portion 54 are held outwardly deviated from the pitch circle of the rack central portion.

Accordingly, when the pickup device 3 moves from the straight travel guide portion of the guide rail onto the circular-arc guid portion thereof, with the right drive gear starting to mesh with the end of the right rack portion 54, the degree of meshing of the right drive gear 49 with the right rack portion 54 progressively increases. This mitigates the shock to be produced upon the start of meshing engagement.

Chassis Construction

Referring to FIG. 16, the subchassis 14 is fixedly provided in a specified position in a central opening of the main chassis 13. A left side frame 15 and a right side frame 16 are fixed to opposite sides of the main chassis 13. The support frame 18 is provided on the upper ends of the two side frames 15, 16 approximately at the midportions thereof. Pins 124, 124 integral with the upper ends of the frames 15, 16 and positioned as specified fit in the support frame 18 to position the frame 18 properly relative to the main chassis 13. The frame 18 is fixed to the two side frames 15, 16 with screws 123, 123.

As already stated, the top chassis 17 is fixedly provided on the left and right guide rails 51, 52 on the subchassis 14. On end of the top chassis 17 has fitted therein a pin 125 integrally formed at a specified position on the support frame 18 and positioning the chassis 17 in place relative to the main chassis 13, and is fixed to the support frame 18 with screws 123.

By viture of the above structure, the left guide rail 51 and the right guide rail 52 are fixed in position relative to the subchassis 14 with high regidity and high accuracy.

As shown in FIG. 17, a mount frame 66 for attaching the spindle motor 21 in place and a support 65 for supporting the base end of the lower guide pole 61, which are made of synthetic resin, are interal with the subchassis 14. With reference to FIG. 18, the lower guide pole 61 has its base end fitted to the support 65 and is fixed at a forward end portion thereof to the subchassis 14 with a screw 67, with a spacer 62 provided therebetween. The upper guide pole 6 is screwed at their opposite ends to the top chassis 17 with spacers 63, 64 provided therebetween. Consequently, the upper guide pole 6 and the lower guide pole 61 are accurately positioned in parallel to the disc radial line and supported at predetermined levels relative to the chassis 17 and 14.

With reference to FIGS. 19 to 27 next, the loading means 7 and the chucking assembly 8 will be described.

Loading Means 7

Figure 19:
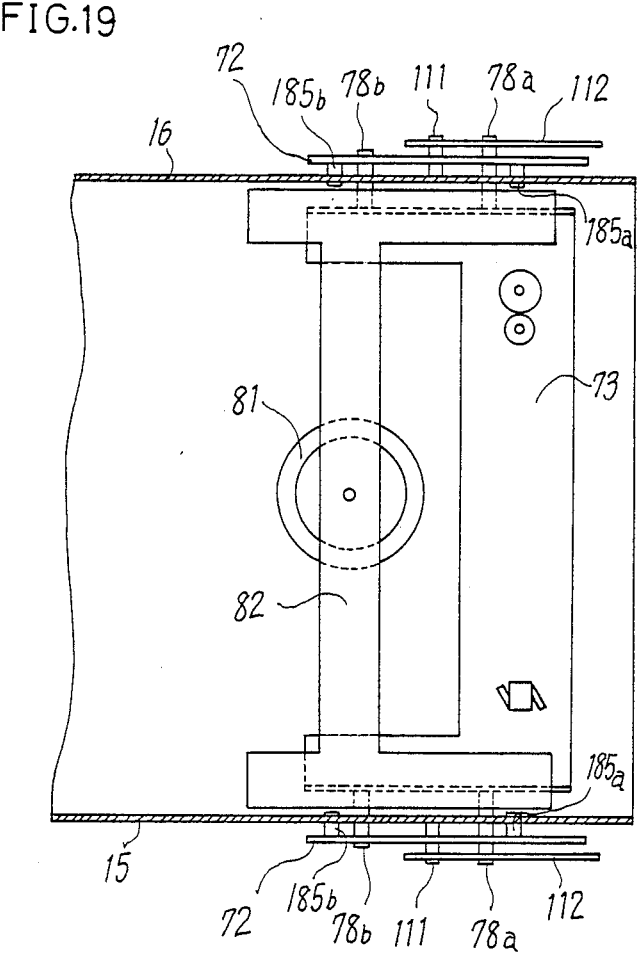
FIG. 19 is a plan view showing a chucking assembly.
Figure 20:
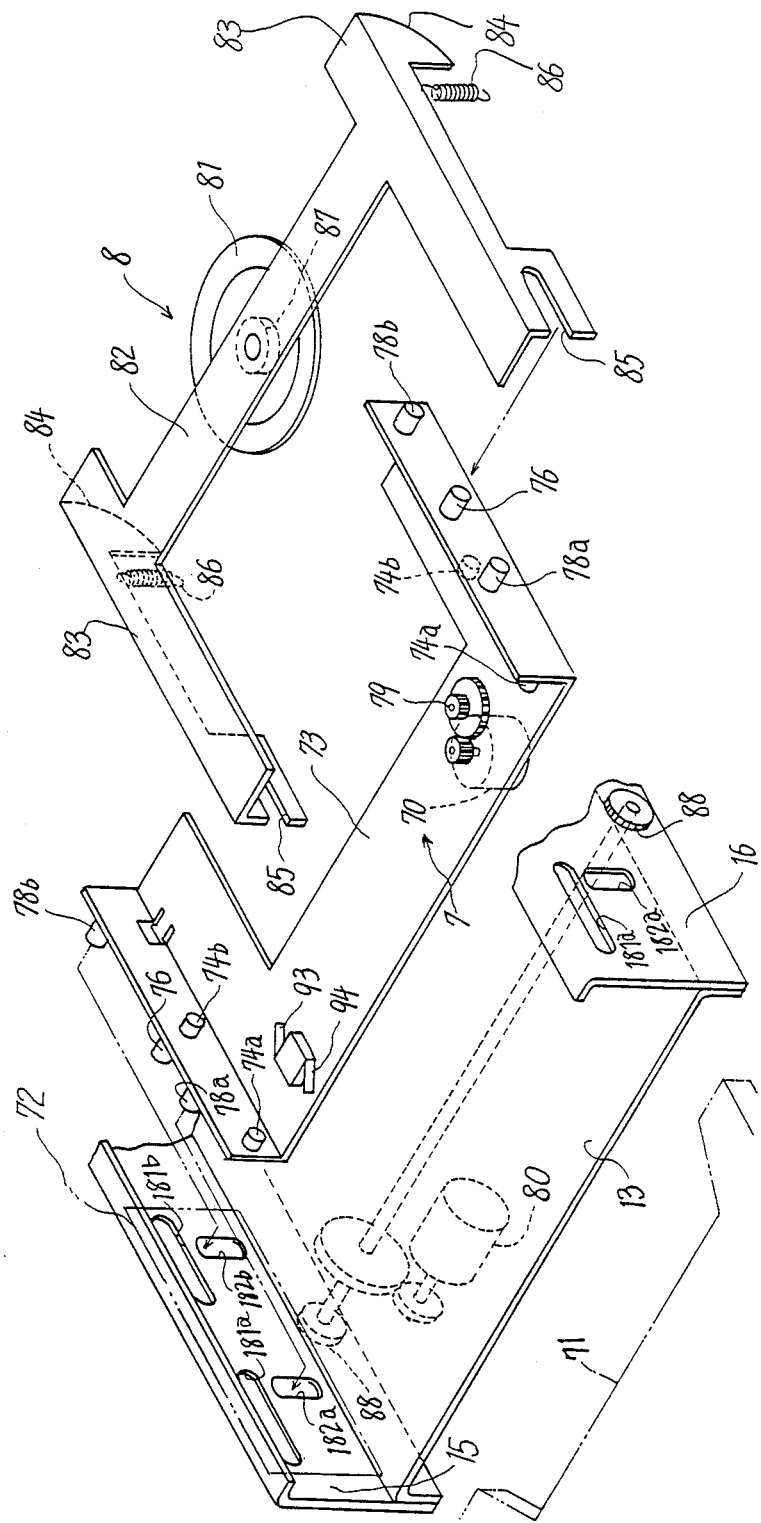
FIG. 20 is an exploded perspective view of the main chassis, tray holder and clamp member.
Figure 22:
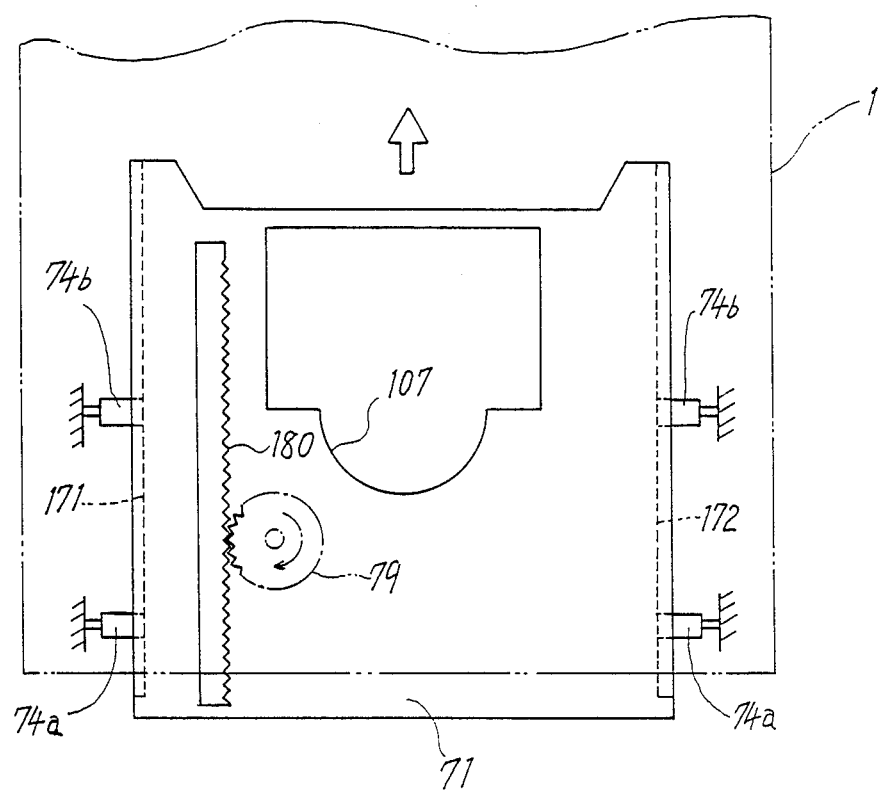
FIG. 22 is a rear view of the disc tray constituting loading means.

The loading means 7 is adapted to horizontally transport the disc 10 along with the disc tray 71 reciprocatingly between two positions, i.e. the disc discharged position shown in FIG. 2 and the disc inserted position inward of a tray holder 73. As shown in FIGS. 19 and 20, the tray holder 73 has inside thereof a pair of guide rollers 74a, 74b projecting inward from each of opposite side plates thereof. As shown in FIGS. 21 and 22, on the other hand, the disc tray 71 is formed in its opposite sides with guide grooves 171, 172 for the guide rollers 74a, 74b to fit in, whereby the tray 71 is guided for reciprocating movement on the tray holder 73.

FIG. 20 shows that the tray holder 73 is equipped with a loading motor 70 and a loading gear 79 coupled to the motor. As seen in FIG. 22, the disc tray 71 is provided on its rear side with a rack 180 meshing with the loading gear 79 and extending in the direction of movement of the disc tray 71. The disc tray 71 is therefore movable into or out of the opening 12 in the front panel 11 by the rotation of the loading motor 70.

The tray holder 73 has a tray-out SW 93 and a tray-in SW 94 for detecting the tray 71 as moved to its withdrawn position and retracted position, i.e. to the disc discharged position and the disc inserted position, respectively. As shown in FIG. 21, on the other hand, the tray 71 has pins 177, 178 projecting downward therefrom at opposite ends with respect to the direction of its movement for actuating the SWs 93, 94, respectively.

Chucking Assembly 8

The chucking assembly 8 is adapted to lift or lower the tray holder 73 with the tray 71 retained thereon, reciprocatingly moving the disc on the tray 71 between two positions, i.e. the disc inserted position and the disc loaded position. In the disc loaded position, the assembly 8 clamps the disc 10 between a disc holding plate 81 and the turntable 22 of the disc drive assembly 2 as will be described below.

With reference to FIGS. 19 and 20, the tray holder side walls each have a pair of outwardly projecting slide pins 78a 78b, while each of the side frames 15, 16 is formed with a pair of vertical guide slots 182a, 182b for the slide pins 78a, 78b to slidably fit in. Accordingly, the tray holder 73 is supported on the main chassis 13 upwardly and downwardly movably.

Figure 23:
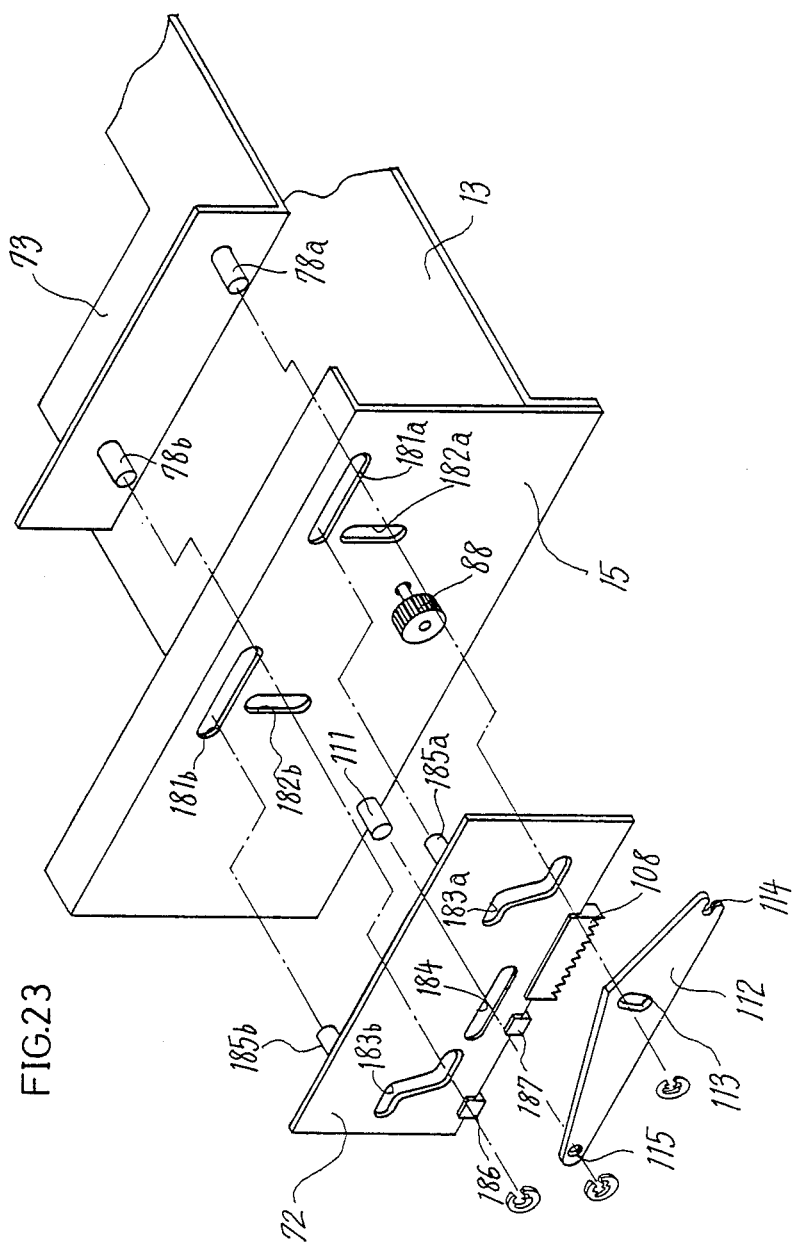
FIG. 23 is an exploded perspective view showing the chucking assembly.

As seen in FIGS. 19 and 23, a loading plate 72 is provided on the outer side of each of the left and right side frames 15, 16. The loading plate 72 has a pair of slide pins 185a, 185b projecting toward the side frame 15 (16). On the other hand, each of the side frames 15, 16 is formed with a pair of horizontal guide slots 181a, 181b positioned in the vicinity of and above the vertical slots 182, 182b, for the slide pins 185a, 185b to slidably fit in, with the result that the loading plates 72 are supported by the respective side frames 15, 16 horizontally reciprocatingly movably relative thereto.

FIG. 23 shows that the loading plate 72 is formed close to their respective longitudinal ends with cam grooves 183a, 183b each having a high cam portion, a low cam portion and a slanting cam portion holding the two cam portions in communication. The forward ends of the slide pins 78a, 78b extend through the respective cam grooves. The loading plate 72 is centrally formed with a horizontal slot 184 for a pin 111, projecting from the side frame 15 (16), to extend therethrough.

With reference to FIG. 20, a pair of chucking gears 88, 88, which are rotatable together, are supported on the side frames 15, 16 at their lower ends for reciprocatingly driving the pair of loading plates 72. A chucking motor 80 provided on the rear side of the main chassis 13 drives the two gears 88, 88. As seen in FIG. 23, a rack member 108 meshing with the gear 88 is secured to each loading plate 72.

The chucking motor 80, when driven, therefore moves both the loading plates 72 at the same time horizontally and reciprocatingly as shown in FIGS. 24 (a) and (b). The left side frame 15 is provided with a tray-up SW 95 and a tray-down SW 96 for detecting the loading plate 72 as positioned at the ends of its movement, while the loading plate 72 has a pair of lugs 186, 187 for actuating these SWs 95, 96.

When the disc tray 71 has been discharged, each loading plate 72 is in one end of its movement close to the front panel 11. The tray holder 73 is in its raised position where the slide pints 78a, 78b are in the high cam portions of the cam grooves 183a, 183b and in the upper ends of the vertical guide slots 182a, 182b as shown in FIG. 24 (a)

After the disc tray 71 has been inserted into the tray holder 73 by driving the loading motor 70, the chucking motor 80 is driven to move the loading plates 72 inward as seen in FIG. 24 (b). The movement of the cam grooves 183a, 183b in this process lowers the slide pins 78a, 78b along the vertical gide slots 182a, 182b to the lower ends of these slots and to the low cam portions of the cam grooves 183a, 183b.

Consequently, the disc tray 71 lowers along with the holder 73, setting the disc 10 on the turntable 22 of the drive assembly 2 as shown in FIG. 28 (c). The disc tray 71 is held at a position lower than the disc 10.

To hold the disc 10 on the turntable 22, the chucking assembly 8 includes a clamp member 82 attached to the tray holder 73 as shown in FIGS. 19 and 20.

The clamp member 82 has the disc holding plate 81 supported by a bearing 87 at its center and a pair of arms 83, 83 at its opposite ends. Each arm 83 is formed at its base end with a U-shaped groove 85 for receiving therein a pivot 76 outwardly projecting from the tray holder 73. The forward end of the arm has a cam face 84 extending in the form of a circular arc in a vertical plane. Springs 86 extending between the tray holder 73 and the respective arms 83 as seen in FIG. 26 bias the clamp member 82 downward about the pivots 76. The cam face 84 is in sliding contact with the slide pin 185b on the loading plate 72.

Accordingly, if the loading plate 72 is positioned at the end of its movement close to the front panel, with the tray holder 73 in its raised position as seen in FIG. 26 (a), the arm 83 is in a counterclockwise turned position against the spring 86 by virtue of the action of the pin 185b on the cam face 84. When the loading plate 72 moves inwardly of the apparatus from this position to lower the tray holder 73 as seen in FIG. 26 (b), the arm 83 pivotally moves clockwise under the action of the spring 86 with the movement of the pin 185b and is held in a substantially horizontal position.

Consequently, the disc holding plate 81 on the clamp member 82 depresses the disc 10 at its center, as seen in FIG. 27 whereby the disc 10 is clamped between the plate 81 and the turntable 22, permitting the spindle motor 21 to drive the disc 10 properly.

Door Opening Mechanism 101

With reference to FIG. 21, the front panel 11 is provided with a door 110 for closing the opening 12. When the disc tray 71 is discharged though the opening 12, the door 110 is opened by the door opening mechanism 101 to be described below and is closed after the tray 71 has been accommodated in the cabinet 1.

As shown in FIGS. 24 (a) and (b), the opening mechanism 101 comprises levers 112 pivotally movable with the chucking assembly 8 to move the door 110 which is pivoted to the front panel 11.

As seen in FIG. 23, the lever 112 has a pin hole 115 at its base end, a slot 113 at its center and a U-shaped groove 114 at its forward end. The outer end of the pin 111 projecting from the left side 15 is fitted in the pin hole 115 of the lever 112. The outer end of the slide pin 78a projecting from the tray holder 73 is engaged in the slot 113.

Referring to FIG. 25, the door 110 has arms 118 projecting from its respective ends. The arm has at its base end a pivot 116 supported by the front panel. The door is rotatable about the pivots through about 90 degrees. A drive pin 117 projection from the outer end of the arm 118 is engaged in the U-shaped groove 114 of lever 112. As seen in FIGS. 24 (a) and (b), therefore, the pivotal movement of the lever 112 with the upward or downward movement of the tray holder 73 opens or closes the door 110.

As seen in FIG. 21, the disc tray 71 has an opening 107 through which the turntable 22 of the disc drive assembly 2 is raised. The disc tray 71 is formed on its front side with a large disc carrying portion 175 having a diameter of about 30 cm and a small disc carrying portion 176 with a diameter of about 20 cm. The large disc carrying portion 175 is formed with an aperture 170 for the finger to engage a small disc when it is to be removed.

The disc tray 71 has at its opposite sides cutouts 173, 174 where the outer peripheral edge of a large disc is positioned when the disc is placed on the portion 175. When the disc is to be removed from the tray 71, fingers are engageable with the disc edge projecting at the cutouts 173, 174, so that the disc can be removed easily.

When the disc tray 71 is positioned as discharged from the cabinet 1, the large disc carrying portion 175 has not been completely withdrawn from the opening 12 but remains at its inner end within the cabinet 1, whereas the front panel opening 12 has an upwardly projecting arcuate upper edge 12a, which renders the disc easy to place on the tray 71 and to remove therefrom.

Electric circuits

Figure 29:
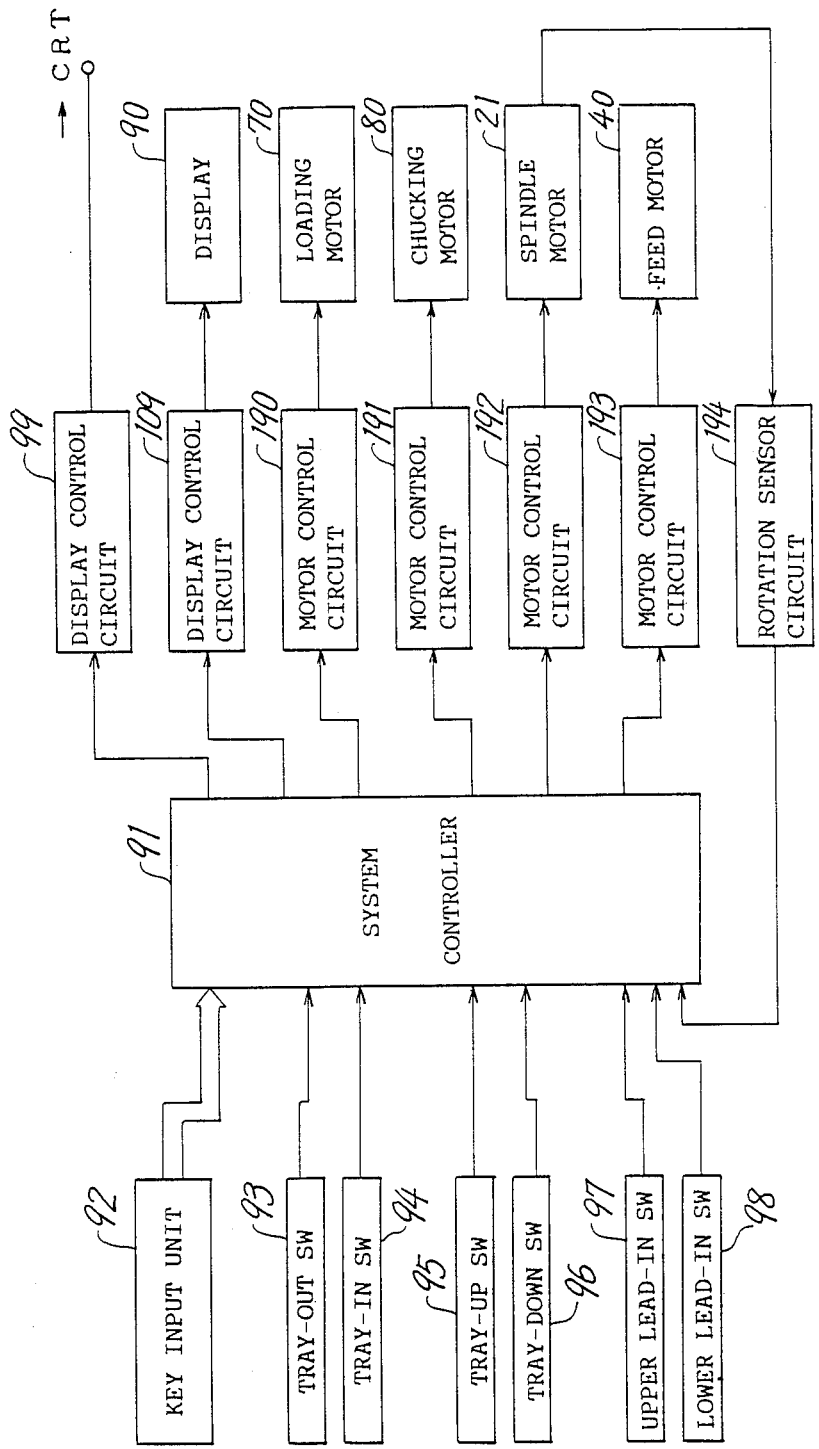
FIGS. 29 and 29A are block diagrams showing electric circuits.
Figure 29A:
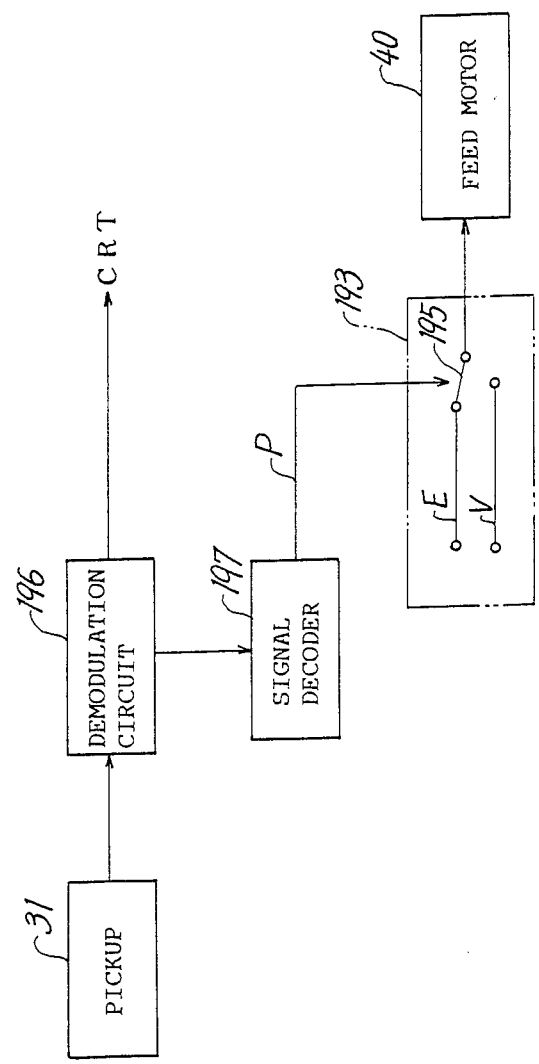

FIGS. 29 and 29A show electric circuits for operating the video disc reproduction apparatus.

Operations such as loading and chucking are controlled by a system controller 91 comprising a microcomputer. Connected to the input ports of the controller 91 are a key input unit 92 having various keys including a power key, PLAY key, etc., and the tray-out SW 93, tray-in SW 94, tray-up SW 95, tray-down SW 96, upper lead-in SW 97 and lower lead-in SW 98. The controller 91 is provided with output ports having connected thereto display control circuits 99, 109 which produce image signals for indicating operation modes, such as "loading," on the CRT to be connected to the reproduction apparatus and on a display 90 provided on the front panel, and motor control circuits 190, 191, 192, 193 for feeding drive signals to the loading motor 70, chucking motor 80, spindle motor 21 and feed motor 40, respectively. The rotation of the spindle motor 21 is detected by a rotation sensor circuit 194 comprising a photocoupler or the like and provided on the turntable 22. The detection signal is fed to another input port of the system controller 91.

With reference to FIG. 29A, the reproduced signals from the pickup 31 are demodulated by a demodulation circuit 196, and the resulting signal is sent to the CRT to show images. A lead-out code representing the terminal end of the signal record portion is recorded at the outermost peripheral portion of the record face of the disc. The lead-out code is fed to a signal decoder 197, which in turn feeds a change signal P to a switch 195 included in the feed motor control circuit 193. The switch 195 has two input terminals having applied thereto a motor drive voltage E (about 0.1V to about 0.2 V) which varies with deviations involved in the tracking of the pickup, and a motor drive voltage (about 5 V) for forcibly moving the pickup at a high speed. By changing over the switch 195, the feed motor 40 is rotated at about 30 to 50 r.p.m. to move the pickup 1 at about 50 micrometers/sec for signal reproduction, or at about 7000 r.p.m. to move the pickup 31 at a speed of about 35 mm/sec when the pickup is moved upward or downward from one side of the disc to the other side thereof.

The electric circuits operate, for example, in the following manner.

When the power key on the key input unit 92 is turned on, the system controller 91 first checks the lower lead-in SW 98 as to whether it is on. If it is off, the feed motor 40 is driven to move the pickup device 3 to the innermost peripheral portion of the lower record face of the disc 10. The controller then waits until an ejection key is depressed.

Upon depression of the ejection key, the controller 91 energizes the motor control circuit 190, which drives the loading motor 70 until the tray-out SW 3 is actuated, whereby the disc tray 71 is discharged from the cabinet 1 as shown in FIG. 28 (a).

A disc 10 is placed on the disc tray 71, and PLAY key is then depressed, whereupon system controller 91 drives the loading motor 70 until the tray-in SW 94 is turned on to accommodate the disc tray 71 in the cabinet 1 as shown in FIG. 28 (b).

Upon the actuation of the tray-in SW 94, the controller 91 energizes the motor control circuit 191, which in turn drives the chucking motor 80 until the tray-down SW 96 is turned on, lowering the disc tray 71 and loading the disc 10 on the drive assembly 2 as shown in FIG. 28 (c).

When the tray-down SW 96 is turned on, the controller 91 rotates the spindle motor 21. Upon the speed of rotation of the motor reaching 1800 r.p.m. which is detected by the rotation sensor circuit 194, the controller energizes the motor control circuit 193 and the signal reproduction circuit (not shown), causing the feed motor 40 to move the pickup device 3 to move for the reproduction of signals from the rotating disc 10.

When the lead-out code is read out, indicating completion of signal reproduction from one side of the disc 10, the spindle motor 21 is brought into reverse rotation under the control of the control circuit 192, while the feed motor 40 is brought into high-speed rotation, causing the pickup device 3 to rapidly move from the lower straight travel guide portions A onto the upper straight travel guide portions B via the circular-arc guide portions C as seen in FIG. 7. The pickup device 3 moves along the upper guide portions B until the upper lead-in SW 97 is actuated to reach the innermost peripheral portion of the disc record face. During the high-speed travel of the pickup 31, the display control circuits 99, 109 function to show "J turn" on the CRT and on the display 90.

The motor control circuit 193 and the signal reproduction circuit are thereafter energized again for reproducing signals from the disc record face while causing the feed motor 40 to move the pickup device 3 toward the disc outer periphery.

In this way, the signals can be reproduced continuously from both sides of the disc 10. During signal reproduction, the display control circuit 99 functions to display on the CRT screen from which of A side and B side the signals are being reproduced.

If STOP key or the ejection key is depressed during signal reproduction, signal reproduction is discontinued, and the lower lead-in SW 98 is checked as to whether it is on. If it is off, the feed motor 40 is driven to bring the pickup device 3 to the innermost peripheral portion of the record face of the disc on the lower side thereof. This renders the disc tray liftable.

When the ejection key is depressed, the chucking motor 80 is driven until the tray-up SW 95 is actuated to lift the disc tray 71 as seen in FIG. 28 (a), whereby the disc 10 is released from the disc drive assembly 2.

Upon the actuation of the tray-up SW 95, the system controller 91 drives the loading motor 70 until the tray-out SW 93 is turned on to discharge the disc tray 71 from the cabinet 1. This renders the disc 10 removable.

Other Modes of Carrying out the Invention

FIGS. 30 to 37 show other embodiments of pickup device of the invention.

Figure 30:
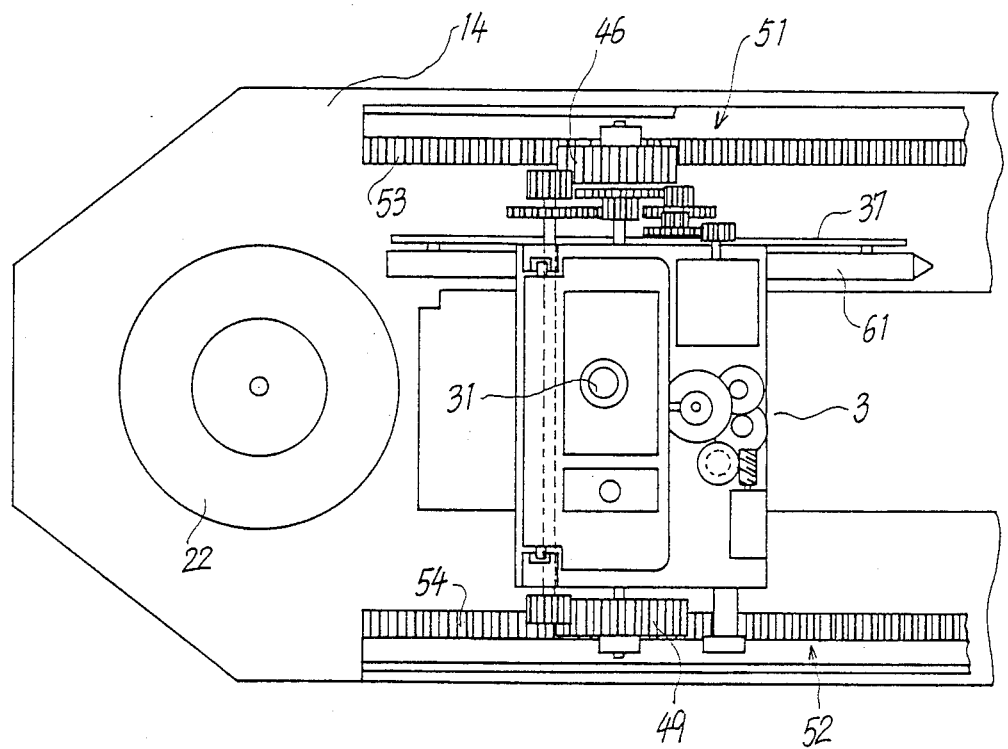
FIGS. 30 to 37 show other embodiments.
Figure 31:
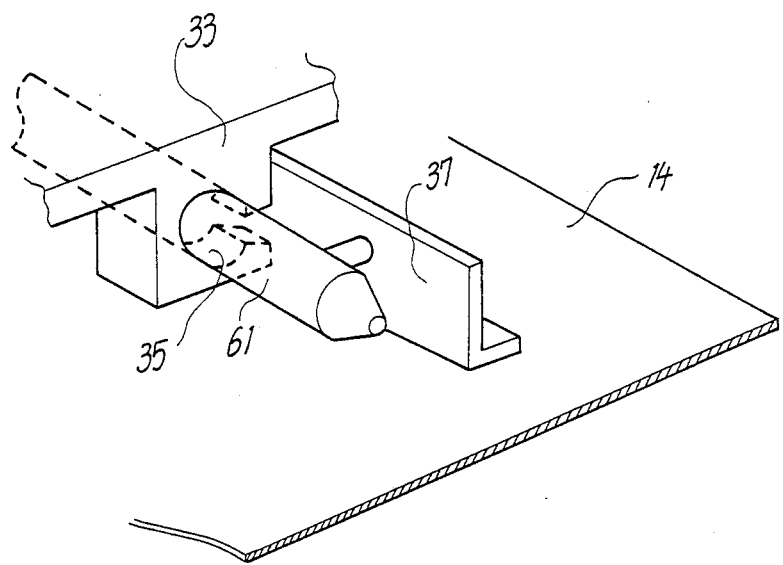
Figure 32:
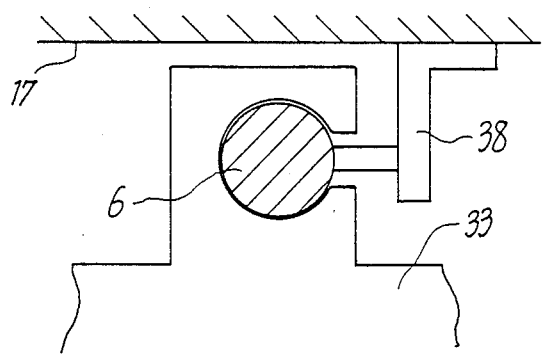

With the embodiment shown in FIGS. 30 to 32, the two guide poles 61, 6 are laterally supported by support members 37, 38 fixed to the chassis 14, 17. Accordingly, the gravity acting on the pickup device supported by the upper pole 6 as shown in FIG. 31 is withstood by the pole over a larger peripheral area thereof than when the upper guide pole is supported vertically, with the result that the pickup device is guidable with higher stability.

The rack portion 54 of the right guide rail 52 extends not only over the circular-arc guide portion but also over the entire lengths of the upper and lower straight travel guide portions (FIG. 30). The pickup device 3 therefore travels horizontally, upward and downward, with the left drive gear 46 and the right drive gear 49 always in mesh with the left rack portion 53 and the right rack portion, respectively.

Figure 33:
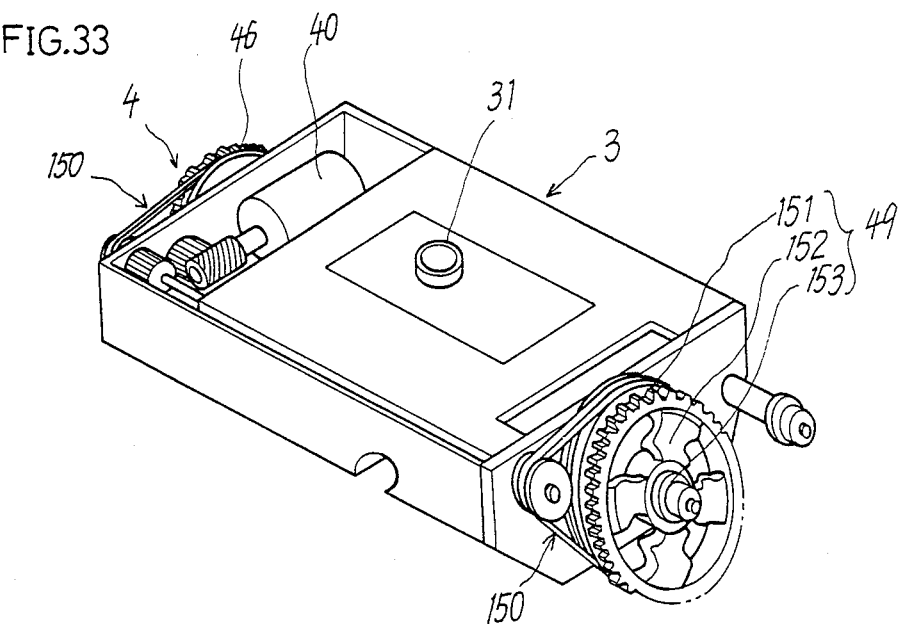
Figure 34:
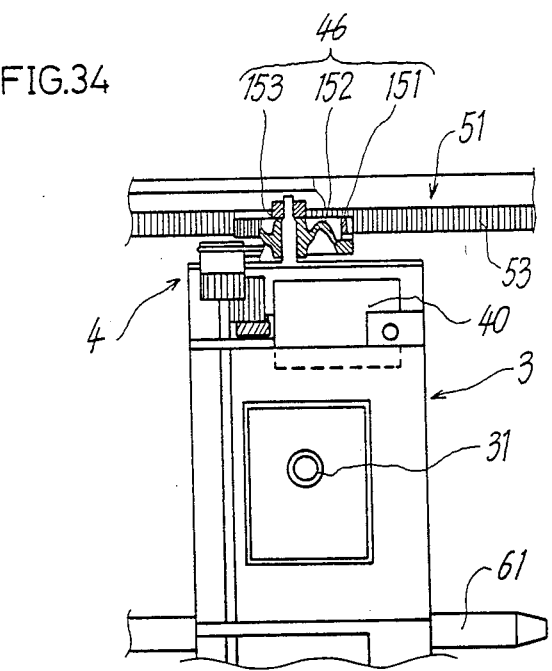

The embodiment of FIGS. 33 and 34 is adapted for use in the pickup transport device wherein the rack portion is formed over the entire lengths of the straight travel guide portions of each guide rail as described above. Each of the left drive gear 46 and the right drive gear 49 has a rotary shaft 153 which is driven by a belt drive mechanism 150 and which is connected to an outer peripheral gear portion 151 by a flexible rib portion 152. For example, it is likely that one of the guide rails will be disposed as slightly inclined with respect to the guide pole within a horizontal plane, with the rack portion extending in a direction at a small angle of deflection with the direction of advance of the pickup device. When the drive gear rotates in mesh with the rack portion in this case, the rib portion 153 then deforms, causing the plane of rotation of the peripheral gear portion 151 to move relative to the rotary shaft 153 to absorb the angle of deflection and thereby permitting the gear portion 151 to mesh with the rack portion smoothly at all times.

Figure 35:
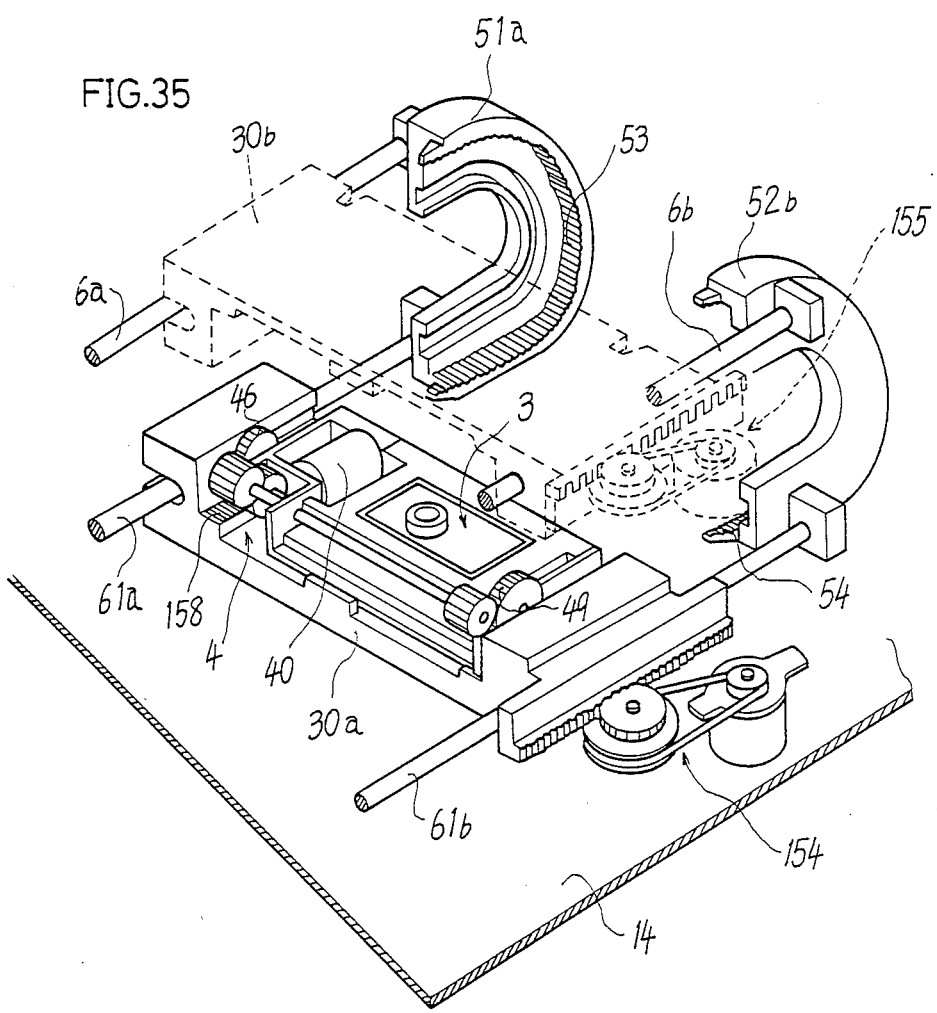
Figure 36:
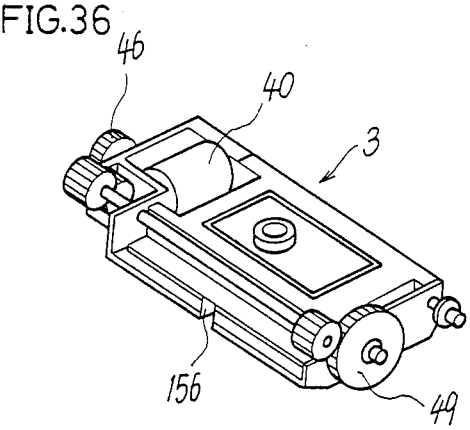
Figure 37:
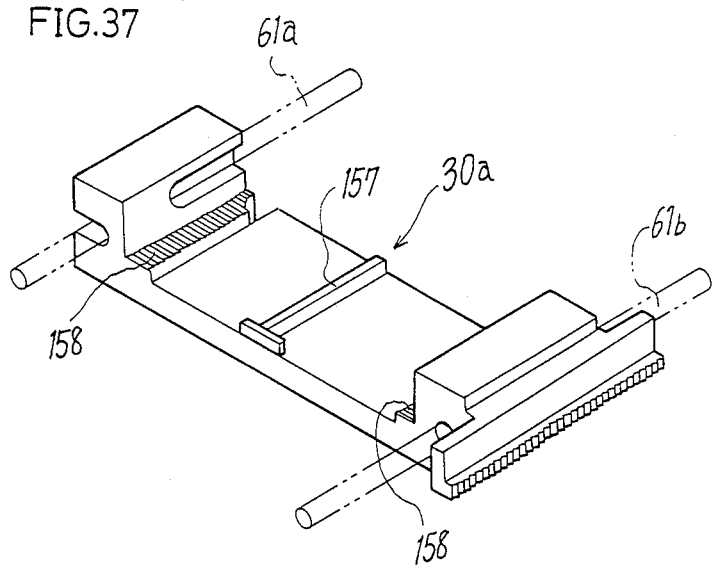
Figure 38:
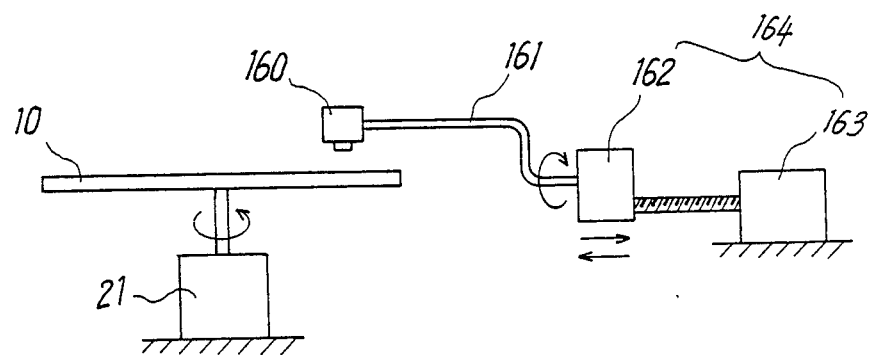
FIG. 38 is a side elevation showing the construction of a conventional pickup transport device.

With the embodiment of FIGS. 35 to 37, motors are used for traveling the pickup device 3 along the straight travel guide portions horizontally, and another motor is used for raising and lowering the device along the circular-arc guide portions.

With reference to FIG. 35, the subchassis 14 has mounted thereon a pair of U-shaped guide rails 51a, 52b consisting only of circular-arc guide portions having respective rack portions 53, 54. A pair of parallel lower guide poles 61a, 61b and a pair of like upper guide poles 6a, 6b are connected to the opposite ends of the two guide rails. A lower transport base 30a is slidably fitted to the pair of lower guide poles, and an upper transport base 30b to the pair of upper guide poles. The transport bases are reciprocatingly driven horizontally by transport means 154, 155, respectively, each comprising a pinion driven by a motor and a rack provided on the transport base and in mesh with the pinion.

The pickup device 3 has in its bottom a guide groove 156 extending in the direction of travel thereof as seen in FIG. 36. As shown in FIG. 37, each transport base is provided with a ridge portion 157 slidingly fittable in the guide groove 156. The drive gears 46, 49 on the pickup device 3 are meshable with racks 158, 158 on each transport base.

For example, when to reproduce signals from the lower side of a disc and then from the upper side thereof successively, the pickup device 3 is provided on the lower transport base 30a as shown in FIG. 35, and the base 30a is horizontally traveled by the transport means 154 for the signal reproduction from the disc lower side. The drive gears 46, 49 of the self-propelled assembly 4 mounted on the pickup device 3, which are in mesh with the racks 158, 158, thereafter come into meshing engagement with the rack portions 53, 54 of the guide rails 51a, 52b, whereby the device 3 is raised and inverted to advance toward a position above the disc. By further rotation of the drive gears 46, 49, the pickup device 3 is placed into the upper transport base 30b. The transport means 155 thereafter moves the transport base 30b for the signal reproduction from the disc upper side.

With the arrangement described above, the pickup device 3 is moved horizontally for signal reproduction by the transport bases 30a, 30b which are driven by the transport means 154, 155, with its self-propelled assembly 4 at rest, so that the vibration of the motor is not transmitted directly to the pickup device 3.

We claim:

1. In an optical disc apparatus including a pickup for reproducing signals from opposite sides of an optical disc or recording signals on opposite sides of an optical disc as said optical disc is rotated in a plane spaced from said pickup, a pickup transport device comprising a support base having said pickup mounted thereon, and a guide assembly for guiding the travel of said support base, said guide assembly being positioned on a chassis having a disc drive motor, said support base being coupled to transport means and being reciprocatingly movable on said guide assembly, said guide assembly comprising left and right guide rails parallel to each other and each formed in a U-shape with a pair of straight travel guide portions disposed in parallel to each other and positioned on opposite sides of, and at equal distances from, said plane of rotation of said disc for moving said pickup along a parallel radial lines equally spaced from the opposite sides of said disc, and a circular portion positioned radially outward of said disc interconnecting the ends of said parallel disposed straight travel guide portions on said opposite sides of said plane of rotation of said disc, said support base, having said pickup mounted thereon, being supported at is opposite side portions on said left and right guide rails, and upper guide pole and a lower pole arranged above said chassis for guiding straight movement of said support base along said straight guide portions of one of said guide rails, said support base being formed with a slide groove for the guide poles to pass therethrough.

2. A pickup transport device as defined in claim 1 wherein one of said guide rails has a rack portion extending over the entire length of said straight travel guide portions and said circular-arc guide portion, and said other guide rail has a rack portion extending only over the entire length of said circular-arc guide portion, said support base being provided with left and right drive gears coupled to a feed motor, said support base being horizontally movable along said straight travel guide portions by one of said drive gears meshing with said rack portion along said straight travel guide portions, said support base being movable upward and downwardly along said circular-arc guide portions by said drive gears meshing with said rack portions, respectively, for transporting said support base.

3. A pickup transport device as defined in claim 2 wherein one of said left and right guide rails has a guide groove over the entire length of the circular-arc guide portion and the other guide rail has a guide groove over the entire length of said straight guide portions and the circular-arc guide portion, said support base having rollers at its opposite ends guided in said guide grooves.

* * * * *